(12) United States Patent
Speer

(10) Patent No.: US 7,228,227 B2
(45) Date of Patent: Jun. 5, 2007

(54) BEZIER CURVE FLIGHTPATH GUIDANCE USING MOVING WAYPOINTS

(75) Inventor: Thomas E. Speer, Des Moines, WA (US)

(73) Assignee: The Boeing Company, Chicago, IL (US)

( * ) Notice: Subject to any disclaimer, the term of this patent is extended or adjusted under 35 U.S.C. 154(b) by 153 days.

(21) Appl. No.: 10/885,809

(22) Filed: Jul. 7, 2004

(65) Prior Publication Data

US 2006/0015247 A1    Jan. 19, 2006

(51) Int. Cl.
    *G01C 21/00* (2006.01)
(52) U.S. Cl. .................... 701/206; 701/201; 701/207; 340/988; 342/357.01
(58) Field of Classification Search ................ 701/200, 701/201, 205, 206, 207, 214, 300; 340/988; 342/357.01, 357.07, 357.14
    See application file for complete search history.

(56) References Cited

U.S. PATENT DOCUMENTS

| 5,650,703 | A  | * | 7/1997  | Yardley et al. | ............. | 318/587 |
| 6,314,363 | B1 | * | 11/2001 | Pilley et al.  | ................ | 701/120 |
| 6,351,708 | B1 | * | 2/2002  | Takagi et al.  | ............... | 701/209 |
| 2003/0060973 | A1 | * | 3/2003 | Mathews et al. | ........... | 701/209 |

OTHER PUBLICATIONS

*Visualization and Interaction on Flight Trajectory In a 3D Stereoscopic Environment*, N. Dang et al., IEEE 2003, 0-7803-7844-X/03, pp. 9.A.5-1-9A.5-10.

*Real-Time Navigation, Guidance, and Control of a UAV Using Low-Cost Sensors*, J. Kim et al., Australian Centre for Field Robotics, University of Sydney, 6 pages.

*Bezier Curves*, http://astronomy.swin.edu.au/~pbourke/curves/bezier/, Jun. 10, 2004, 5 pages.

*Piecewise Cubic Bezier Curves*, http://astronomy.swin.edu.au/~pbourke/curves/bezier/cubicbezier.html, Mar. 16, 2004, 6 pages.

*What's A Bezier Curve?*, http://www.moshplant.com/direct-or/bezier/, Mar. 11, 2004, 1 page.

*The Math Behind the Bezier Curve*, http://www.moshplant.com/direct-or/bezier/math.html, Mar. 11, 2004, 2 pages.

*Simple Curves*, http://www.moshplant.com/direct-or/bezier/simple_curve.html, Mar. 11, 2004, 1 page.

*Recurves*, http://www.moshplant.com/direct-or/bezier/recurve.html, Mar. 11, 2004, 1 page.

(Continued)

*Primary Examiner*—Gertrude A. Jeanglaude
(74) *Attorney, Agent, or Firm*—Alston & Bird LLP

(57) ABSTRACT

A flightpath guidance system and method is disclosed for using moving waypoints for a curved route plan such as a Bezier curve. The actual location of a vehicle and a leading target point along the path are used to provide commanded guidance of the vehicle along the path and to correct for disturbances from the intended route. Waypoints along the path may be moving with respect to the reference frame in which the vehicle is measured. Curved flightpath guidance using moving waypoints may be used for aerial rendezvous and refueling, multiple vehicle applications such as formation flying and battlefield formation grouping, and carrier landing. Further application includes air traffic control and commercial flight guidance systems.

48 Claims, 3 Drawing Sheets

OTHER PUBLICATIONS

Bezier Curves, http://www.ece.eps.hw.ac.uk/~dml/cgonline/hyper00/curvesurf/bezier.html, Mar. 16, 2004, 8 pages.

*Piecewise Curves*, http://www.reed.edu/nobles/thesis/node4.html, Mar. 16, 2004, 6 pages.

* cited by examiner

BEZIER CURVE FLIGHTPATH GUIDANCE USING MOVING WAYPOINTS

FIELD OF THE INVENTION

The present invention relates generally to flightpath guidance, and, more particularly, to the use of Bezier curves to command flightpath guidance using moving waypoints for unmanned air vehicles.

BACKGROUND

To reduce the risk to human life, unmanned air vehicles (UAVs) are being developed for unpiloted, autonomous flight operations, such as surveillance or combat missions. Previously, drones were actively commanded and navigated with remote control during such operations or the vehicles were programmed to move according to a predetermined course.

UAV flight guidance systems are suited currently for formation flying, carrier landing, aerial refueling, and other common maneuvers.

Conventional navigation and guidance systems rely upon use of waypoints that are fixed in space and, typically, connected by straight line segments. This leads to ad-hoc modifications for guidance in turns, long linear queues for UAV and UCAV landing approaches that maximize the potential for dangerous wake vortex encounters, and excessively complex mission plans to achieve desired routes. Fixed waypoints are fundamentally incapable of effectively handling rendezvous problems such as carrier landing, aerial refueling, and formation flight, thus requiring separate modes for accomplishing each of these tasks. Other like conventional navigation and guidance systems are similarly limited by use of fixed waypoints or straight-line segments.

Thus it would be advantageous to design an improved flightpath guidance system and method for such applications as future unmanned vehicle systems and air traffic control systems.

SUMMARY OF THE INVENTION

In light of the foregoing background, embodiments of the present invention provide a flightpath guidance system and method using moving waypoints and curved line segments. One embodiment of a guidance system of the present invention includes a processing element for defining a path defined by a series of waypoints along which a vehicle may be guided, a current position of the vehicle relative to the intended path, a target position along the path, and a guidance command for steering the vehicle towards the target position. The processing element guidance command is capable of accounting for movement of at least one of the waypoints. A further embodiment of the present invention may include a target, or an ideal, position, defined by the processing element, for the vehicle along the path where the current position of the vehicle is perpendicular to a tangent to the path at the ideal position. A guidance subsystem may be included in an embodiment of the present invention to update the processing element definition of the current position and target position, thus creating a repeating loop in order to iterate the progression of the vehicle along the intended path through the series of waypoints.

A guidance subsystem for an embodiment of the present invention may be capable of checking waypoint sequencing, thus identifying which of the series of waypoints is the previous waypoint through which the vehicle has just passed and the current and next waypoints through which the vehicle will pass. Based upon checking waypoint sequencing, the guidance subsystem can identify that the current waypoint through which the vehicle has just passed should become a previous waypoint and, similarly, the next waypoint will become a current waypoint to which the vehicle is now guided along the ideal path. In embodiments of the present invention, the processing element may define the path between successive waypoints to be curved and the ideal path to be a Bezier curve. In further embodiments of the present invention successive waypoints along the series of waypoints of the path may be moving. The present invention also provides corresponding methods for controlling a vehicle in accordance with embodiments of the present invention.

A further embodiment of the present invention provides a method of navigating a vehicle including commanding guidance of the vehicle from a previous waypoint to a current waypoint, wherein departure from the previous waypoint is controlled by guidance commands based at least on the previous waypoint and approach to the current waypoint is controlled by guidance commands based at least on the current waypoint. Guidance of the vehicle may be commanded to reduce divergence from an intended position on the path based at least on the target distance along the intended path ahead of the intended position where the target distance ahead of the vehicle, or the intended position of the vehicle along the path, is constant.

Further embodiments of the present invention provide a vehicle capable of making adjustments to flight guidance based upon generated guidance commands derived from flight data such as movement of a waypoint defining an intended flight path. Such a vehicle may include a guidance system for controlling the movement of the vehicle, such as the hardware and electronics necessary to allow an operator or an automated system to control the flight of an airplane, a navigation processor capable of generating guidance commands for the guidance system, and a waypoint movement system, such as an optical tracking system or a communication system for receiving movement data from an external source such as a vehicle representing a moving waypoint. An associated method of the present invention is also provided for navigating a vehicle in flight. The vehicle may adjust crabbing into the wind to adjust for an intended flight path determined by the guidance commands of a navigational controller using a Bezier curve navigation process to account for movement of waypoints.

Curved flightpath guidance using moving waypoints of the present invention may provide improved automated aerial rendezvous and refueling and carrier landing capabilities for UAVs and UCAVs. The present invention may also be used for multiple vehicle applications, including conventionally manned and actively controlled vehicles, in the air and on the battlefield, such as by reducing cycle time for advance control systems for coordination of the multiple vehicles. The present invention may also provide increased separation and air traffic control and flexibility for greater safety and simplify commercial flight management systems and improve air transport efficiency.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

Figure 1:
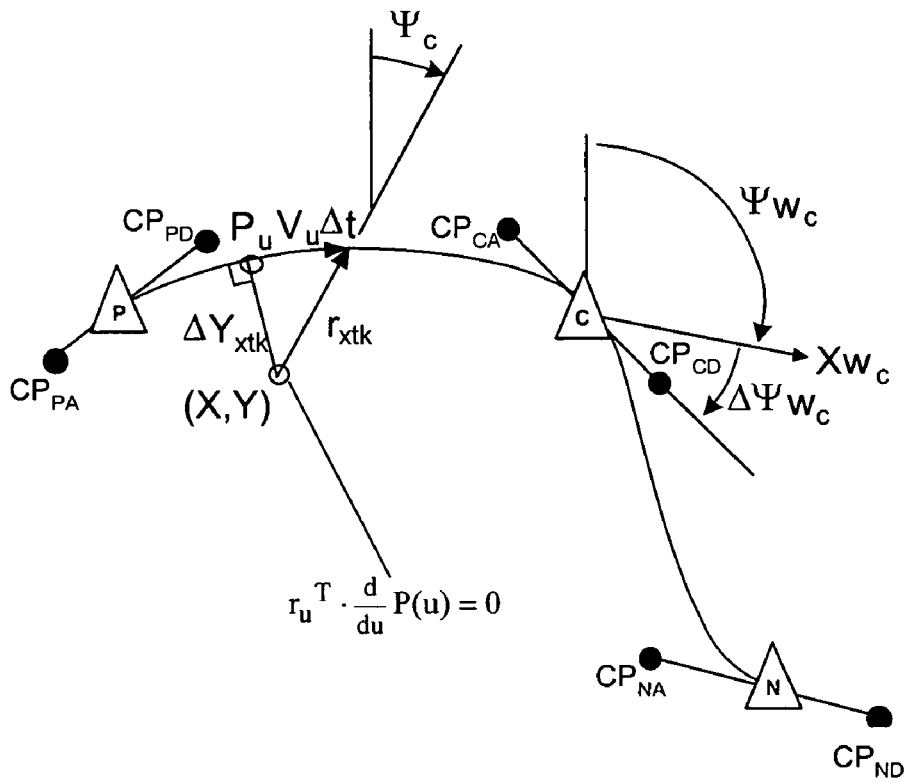
FIG. 1 is an example Bezier curve flightpath guidance diagram of one embodiment of the present invention.

The present inventions now will be described more fully hereinafter with reference to the accompanying drawings, in which some, but not all embodiments of the invention are shown.

Indeed, these inventions may be embodied in many different forms and should not be construed as limited to the embodiments set forth herein; rather, these embodiments are provided so that this disclosure will satisfy applicable legal requirements. Like numbers and variables refer to like elements and parameters throughout.

While embodiments of the present invention may be particularly useful in the aircraft industry for flightpath guidance, the invention is also useful for many domains and for a variety of applications, including, for example, all manner of different types of unmanned vehicles, including combat flight, ground, and naval vehicles, and similar automated navigation systems, including applications for satellites in space and submarines. Example applications for the present invention include future combat systems (FCS), control for multi-mission UAVs (CMUS), Navy UCAV (UCAV-N), Canard rotor wing (CRW), sensor craft, data exploitation mission planning and communications UAVs (DEMPC), and commercial flight management systems.

Different methods have been developed to represent curves, particularly for modeling waypoint routes, flight trajectories, and other applications. Some methods use straight line segment representations, others use curve-form trajectories. Parametric polynomial curves, such as B-Spline, Bezier, and Hermite curves, may be used to represent curve-form trajectories. Typically waypoints are a trench variety where the corners of a polygon define the waypoints and a curved arc forms the corner within the polygon without passing through the waypoint. Bezier curves are widely used in computer graphics and similar computer aided design (CAD) systems. For example, drawing objects in presentation software may use Bezier curves. A Bezier curve is a polynomial parametric curve function defined by a set of control points. Various forms of Bezier curves, typically defined by the number of control points and, therefore, the degree of the representative polynomial parametric equations, form curves between anchor points as defined by the control points. Bezier curves may be used to define a path defined by a number of successive curved segments that are defined by guidance through successive waypoints, rather than a path where waypoints define corners of the path. Waypoints define a position, and control points define the curve of a path through a waypoint. For example, the path will cross through a waypoint, but the control point determines the manner in which the path approaches and departs from the waypoint. As used herein, waypoints define an intended path between a relative starting point and a relative ending point or target and control points define and modify the shape of the curve between, approaching, and departing from anchor points. Typically, a pair of control points define a line through the waypoint. The path passes through the waypoint at a tangent to the line defined by the pair of control points. A Bezier curve will leave a waypoint in the direction of a control point, but will curve away from the control point towards the next successive waypoint. The relative distance a control point extends from the waypoint defines how strongly the path will curve away from the control point. Relative weighting of the control points refers to the distance and orientation with respect to the waypoint and defines how strong the curvature of the path will be on either side of the waypoint. Essentially, the distance of the control point from the associated waypoint determines how strongly the curve is bent after leaving the waypoint. For example, if a control point approaching a waypoint is relatively large, the path may approach the waypoint and sharply turn towards the tangent to the line defined by the control points. And if the departure waypoint is relatively weak, the path may slowly diverge from the tangent line towards the next successive waypoint. Embodiments of the present invention are not limited to a particular type of Bezier curve or the equations and solutions provided for the Bezier curves of the example embodiments provided herein. Embodiments of the present invention may employ different Bezier curves in accordance with the present invention for flightpath guidance using moving waypoints.

FIG. 1 is an example Bezier curve flightpath guidance diagram generated by a system or method of one embodiment of the present invention. The path or route is comprised of a series of waypoints. At any given time, at least three waypoints are in consideration, shown as triangles in FIG. 1. Specifically, more than three waypoints could be considered in accordance with the present invention; however, for simplicity of understanding, the example embodiments provided herein include only three waypoints for consideration at one time. In FIG. 1, a previous waypoint, shown as the triangle identified with a P, is defined by control points identified as an approach control point for the previous waypoint $CP_{PA}$ and a departure control point for the previous waypoint $CP_{PD}$. The current waypoint C and next waypoint N are similarly shown as triangles and defined by approach and departure control points $CP_{CA}$, $CP_{CD}$, $CP_{NA}$, and $CP_{ND}$. These control points define the curve of the path through the waypoint. FIG. 1 shows the segments between any two waypoints being defined or represented by Bezier curves.

Because at any given time three waypoints are under consideration, the three waypoints under consideration will change based upon progression along the path. For example, after passing through waypoint C, waypoint C will become the previous waypoint and waypoint N will become the current waypoint with a subsequent waypoint becoming the next waypoint.

Figure 2:
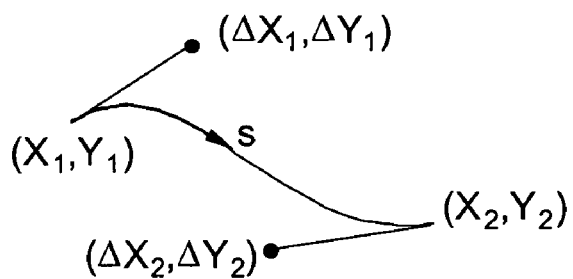
FIG. 2 is an example diagram of a Bezier curve segment between two waypoints with respective control points according to one embodiment of the present invention.

FIG. 2 shows an isolated segment of a Bezier curve. A previous end point or waypoint ($X_1$, $Y_1$), also known as a first waypoint, is defined by a departure control point ($\Delta X_1$, $\Delta Y_1$). A current end point or waypoint ($X_2$, $Y_2$), also known as a second end point, is defined by an approach control point ($\Delta X_2$, $\Delta Y_2$). The curve S between the first end point and the second end point may be defined by a Bezier curve. In that manner, FIG. 2 may be applied to the route and waypoint sequencing of FIG. 1. As will be evident in the following description of an embodiment of the present invention, the mathematical symbols represented in FIGS. 1 and 2 are used for solving for guidance using movement waypoints.

One of ordinary skill in the art will recognize that FIG. 1 only represents two dimensional aspects of movement along a path and will understand corresponding three dimensional characteristics and variables not represented in FIG. 1 but included within the scope of the present invention. In this regard, an embodiment of the present invention is described herein in three dimensions providing for six degrees of freedom from which one of ordinary skill in the art may identify parameters not represented in the simplification of FIG. 1. The embodiment described herein uses symbolic mathematic systems based on well established principles to define and describe a new approach to waypoint guidance.

The Bezier curve B of the route in FIG. 1 is further defined by an independent variable u which varies from 0 to 1. Similarly, a point B(u) along the Bezier curve may be defined by the independent variable u. The velocity of movement along the path defined by the B curve may also be defined by the independent variable u and represented by V(u). The course of movement along the path may be defined relative to an azimuthal angle represented by $\Psi$ and an elevation angle represented by $\gamma$.

Although movement would ideally follow the path, movement, for example a vehicle being guided along the path, may be disturbed from the path such as an aircraft being blown off track by a crosswind or a vehicle maneuvering around an obstacle. In such a case where movement is disturbed from the path, corrections must be provided to guide the movement in order to bring the actual movement back to the path. In order to determine correction guidance commands, a current location along the path for the ideal position and the actual position such as a present position of the vehicle may be defined. The correction back to the path generally may be referred to as crosstrack (xtk) guidance, referring to a linear path which would cross over the intended track or path. To determine crosstrack guidance commands, the present position along the path, or ideal position along the path, $P_u$ may define a perpendicular vector $\Delta Y_{xtk}$ from the intended route to the current position such as the location of the vehicle that is intended to be guided along the path.

The actual position or current location of a vehicle is then defined as being the point on the curve $P_u$ where a position vector to the vehicle is perpendicular to the desired path. A crosstrack guidance command to correct back to the path may be defined by both the actual position or current location of a vehicle and a target position along the path ahead of the $P_u$ position on the path. This target position may be defined by a lead time $\Delta t$ and the velocity $V_u$ of movement along the path. The ideal position along the path or the commanded position along the path defines the guidance command to bring a vehicle back to the path determined by a commanded course $\Psi_c$ and a commanded angle $\gamma_c$ from the actual location of the vehicle. The commanded course and commanded angle provide a crosstrack gain determined by the independent variable u and the lead time $\Delta t$.

The previous discussion, however, does not consider the potential for waypoints to be moving during guidance based upon those waypoints. Conventionally, waypoints are fixed in space relative to a reference frame such as the Earth. Moving generally describes the property of a change in position or orientation of a waypoint in the reference frame in which the position and orientation of a vehicle is measured such that guidance of the vehicle may account for the change in position of the waypoint. However, waypoints may be moving such as where they are fixed with reference to a moving object such as defined by an aircraft carrier or moving in a fixed reference frame such as defined by Earth. For example, in FIG. 1 the current waypoint is defined as having movement $X_{Wc}$ along the x-axis at angle $\Psi$ of attitude, with a change in attitude of $\Delta \Psi$. A waypoint may move in any manner, such as along a single axis or across multiple axes. As described herein, even after a vehicle may have passed a waypoint, the movement of the waypoint may remain as a variable in an equation to control the movement of the vehicle. In some situations, even rotational movement of a waypoint would be important to control the guidance of a vehicle.

By way of further describing the present invention, the following is an embodiment for guidance along a Bezier curve route using waypoints that may be fixed or moving. Presented first for comparison is an embodiment of the present invention for fixed waypoints. Following the fixed waypoint solution is an embodiment of the present invention that accommodates moving waypoints. Generally, these embodiments may be referred to as a solution to Bezier curve route geometry for moving waypoints. The embodiments, however, are much more than geometry and include commands for guidance along the Bezier curve route including divergence from the route and waypoints that are moving.

As previously described the independent parameter u varies from 0 to 1, or $0 \leq u \leq 1$. The solution for the Bezier curve using fixed waypoints ($X_1$, $Y_1$, $Z_1$) and ($X_2$, $Y_2$, $Z_2$) can be represented by $$B(u) = \begin{bmatrix} X_1 \\ Y_1 \\ Z_1 \end{bmatrix} \cdot (1-u)^3 + \begin{bmatrix} X_1 + \Delta X_1 \\ Y_1 + \Delta Y_1 \\ Z_1 + \Delta Z_1 \end{bmatrix} \cdot 3 \cdot$$

$$u\cdot(1-u)^2 + \begin{bmatrix} X_2 + \Delta X_2 \\ Y_2 + \Delta Y_2 \\ Z_2 + \Delta Z_2 \end{bmatrix}\cdot 3\cdot u^2\cdot(1-u) + \begin{bmatrix} X_2 \\ Y_2 \\ Z_2 \end{bmatrix}\cdot u^3.$$

Expanding the solution provides $$B(u) = \begin{bmatrix} (2\cdot u+1)\cdot(u-1)^2\cdot X_1 + 3\cdot u\cdot(u-1)^2\cdot\Delta X_1 + -u^2\cdot \\ (-3+2\cdot u)\cdot X_2 + -3\cdot u^2\cdot(u-1)\cdot\Delta X_2 \\ (2\cdot u+1)\cdot(u-1)^2\cdot Y_1 + 3\cdot u\cdot(u-1)^2\cdot\Delta Y_1 + -u^2\cdot \\ (-3+2\cdot u)\cdot Y_2 + -3\cdot u^2\cdot(u-1)\cdot\Delta Y_2 \\ (2\cdot u+1)\cdot(u-1)^2\cdot Z_1 + 3\cdot u\cdot(u-1)^2\cdot\Delta Z_1 + -u^2\cdot \\ (-3+2\cdot u)\cdot Z_2 + 3\cdot u^2\cdot(u-1)\cdot\Delta Z_2 \end{bmatrix}.$$

Further regrouping the solution provides $$B(u) = \begin{bmatrix} (3\cdot\Delta X_1 + 2\cdot X_1 - 2\cdot X_2 - 3\cdot\Delta X_2)\cdot \\ u^3 + (-3\cdot X_1 + 3\cdot X_2 - 6\cdot\Delta X_1 + 3\cdot\Delta X_2)\cdot \\ u^2 + 3\cdot\Delta X_1\cdot u + X_1 \\ (3\cdot\Delta Y_1 + 2\cdot Y_1 - 2\cdot Y_2 - 3\cdot\Delta Y_2)\cdot \\ u^3 + (-3\cdot Y_1 + 3\cdot Y_2 - 6\cdot\Delta Y_1 + 3\cdot\Delta Y_2)\cdot \\ u^2 + 3\cdot\Delta Y_1\cdot u + Y_1 \\ (3\cdot\Delta Z_1 + 2\cdot Z_1 - 2\cdot Z_2 - 3\cdot\Delta Z_2)\cdot \\ u^3 + (-3\cdot Z_1 + 3\cdot Z_2 - 6\cdot\Delta Z_1 + 3\cdot\Delta Z_2)\cdot \\ u^2 + 3\cdot\Delta Z_1\cdot u + Z_1 \end{bmatrix}.$$

The velocity of movement along the curve route using fixed waypoints may be solved by applying the chain rule to differentiating the Bezier curve, represented by $$\frac{d}{du}B(u) = \begin{bmatrix} 6\cdot u\cdot(u-1)\cdot X_1 + 3\cdot(3\cdot u-1)\cdot(u-1)\cdot \\ \Delta X_1 + -6\cdot u\cdot(u-1)\cdot \\ X_2 + -3\cdot u\cdot(-2+3\cdot u)\cdot\Delta X_2 \\ 6\cdot u\cdot(u-1)\cdot Y_1 + 3\cdot(3\cdot u-1)\cdot(u-1)\cdot \\ \Delta Y_1 + -6\cdot u\cdot(u-1)\cdot \\ Y_2 + -3\cdot u\cdot(-2+3\cdot u)\cdot\Delta Y_2 \\ 6\cdot u\cdot(u-1)\cdot Z_1 + 3\cdot(3\cdot u-1)\cdot(u-1)\cdot \\ \Delta Z_1 + -6\cdot u\cdot(u-1)\cdot \\ Z_2 + -3\cdot u\cdot(-2+3\cdot u)\cdot\Delta Z_2 \end{bmatrix}.$$

Again, regrouping the solution provides $$\frac{d}{du}B(u) = \begin{bmatrix} (9\cdot\Delta X_1 + 6\cdot X_1 - 6\cdot X_2 - 9\cdot\Delta X_2)\cdot u^2 + \\ (-6\cdot X_1 + 6\cdot X_2 - 12\cdot\Delta X_1 + 6\cdot\Delta X_2)\cdot u + 3\cdot\Delta X_1 \\ (9\cdot\Delta Y_1 + 6\cdot Y_1 - 6\cdot Y_2 - 9\cdot\Delta Y_2)\cdot u^2 + \\ (-6\cdot Y_1 + 6\cdot Y_2 - 12\cdot\Delta Y_1 + 6\cdot\Delta Y_2)\cdot u + 3\cdot\Delta Y_1 \\ (9\cdot\Delta Z_1 + 6\cdot Z_1 - 6\cdot Z_2 - 9\cdot\Delta Z_2)\cdot u^2 + \\ (-6\cdot Z_1 + 6\cdot Z_2 - 12\cdot\Delta Z_1 + 6\cdot\Delta Z_2)\cdot u + 3\cdot\Delta Z_1 \end{bmatrix}.$$

The velocity then may be represented by $$V = \left(\frac{d}{du}B(u)\right)\frac{d}{dt}u.$$

Substituting for d/du B(u) provides $$V = \begin{bmatrix} (-6\cdot u + 6\cdot u^2)\cdot X_1 + (3 - 12\cdot u + 9\cdot u^2)\cdot\Delta X_1 + \\ (6\cdot u - 6\cdot u^2)\cdot X_2 + (6\cdot u - 9\cdot u^2)\cdot\Delta X_2 \\ (-6\cdot u + 6\cdot u^2)\cdot Y_1 + (3 - 12\cdot u + 9\cdot u^2)\cdot\Delta Y_1 + \\ (6\cdot u - 6\cdot u^2)\cdot Y_2 + (6\cdot u - 9\cdot u^2)\cdot\Delta Y_2 \\ (-6\cdot u + 6\cdot u^2)\cdot Z_1 + (3 - 12\cdot u + 9\cdot u^2)\cdot\Delta Z_1 + \\ (6\cdot u - 6\cdot u^2)\cdot Z_2 + (6\cdot u - 9\cdot u^2)\cdot\Delta Z_2 \end{bmatrix}\cdot\left(\frac{d}{dt}u\right).$$

Given that the speed of the vehicle is known, progress along the path or route will match the inertial vehicle speed and may be solved for an ordinary nonlinear differential equation that can be integrated over time to get the position of a vehicle progressing at a given speed along the path, represented by $$\frac{d}{dt}u = \frac{V_i}{3\cdot\sqrt{\begin{array}{l}[(-2\cdot u + 2\cdot u^2)\cdot X_1 + (1 - 4\cdot u + 3\cdot u^2)\cdot\Delta X_1 + \\ (2\cdot u - 2\cdot u^2)\cdot X_2 + (2\cdot u - 3\cdot u^2)\cdot\Delta X_2]^2 \ldots + \\ [(-2\cdot u + 2\cdot u^2)\cdot Y_1 + (1 - 4\cdot u + 3\cdot u^2)\cdot\Delta Y_1 + \\ (2\cdot u - 2\cdot u^2)\cdot Y_2 + (2\cdot u - 3\cdot u^2)\cdot\Delta Y_2]^2 \ldots + \\ [(-2\cdot u + 2\cdot u^2)\cdot Z_1 + (1 - 4\cdot u + 3\cdot u^2)\cdot\Delta Z_1 + \\ (2\cdot u - 2\cdot u^2)\cdot Z_2 + (2\cdot u - 3\cdot u^2)\cdot\Delta Z_2]^2\end{array}}}.$$

It may be noted that the ellipses, . . . , in the previous equation are meant to represent line wraps and not continuations that do not appear. This convention is used herein throughout.

The distance between subsequent waypoints along the path is solved by the arclength formula, $$S = \int_0^1 \sqrt{\left(\frac{d}{du}X\right)^2 + \left(\frac{d}{du}Y\right)^2 + (dZ)^2}\,du,$$

expanded and substituted to derive $$S = 3\cdot\int_0^1 \sqrt{\begin{array}{l}[(-2\cdot u + 2\cdot u^2)\cdot X_1 + (1 - 4\cdot u + 3\cdot u^2)\cdot\Delta X_1 + \\ (2\cdot u - 2\cdot u^2)\cdot X_2 + (2\cdot u - 3\cdot u^2)\cdot\Delta X_2]^2 \ldots + \\ [(-2\cdot u + 2\cdot u^2)\cdot Y_1 + (1 - 4\cdot u + 3\cdot u^2)\cdot\Delta Y_1 + \\ (2\cdot u - 2\cdot u^2)\cdot Y_2 + (2\cdot u - 3\cdot u^2)\cdot\Delta Y_2]^2 \ldots + \\ [(-2\cdot u + 2\cdot u^2)\cdot Z_1 + (1 - 4\cdot u + 3\cdot u^2)\cdot\Delta Z_1 + \\ (2\cdot u - 2\cdot u^2)\cdot Z_2 + (2\cdot u - 3\cdot u^2)\cdot\Delta Z_2]^2\end{array}}\,du.$$

As evidenced from the above equation, the distance or spacing between waypoints does not impair the present invention. Rather, the nature of Bezier curves accounts for the distance between waypoints in the polynomial parametric curve equations for a Bezier curve.

The course $\Psi$ and angle $\gamma$ at any point u is found by solving for the tangent to the curved path, as follows:

$$\cos(\Psi) = \frac{\begin{array}{l}(-2\cdot u+2\cdot u^2)\cdot X_1+(1-4\cdot u+3\cdot u^2)\cdot \Delta X_1+\\(2\cdot u-2\cdot u^2)\cdot X_2+(2\cdot u-3\cdot u^2)\cdot \Delta X_2\end{array}}{\sqrt{\begin{array}{l}[(-2\cdot u+2\cdot u^2)\cdot X_1+(1-4\cdot u+3\cdot u^2)\cdot \Delta X_1+\\(2\cdot u-2\cdot u^2)\cdot X_2+(2\cdot u-3\cdot u^2)\cdot \Delta X_2]^2\ldots+\\[(-2\cdot u+2\cdot u^2)\cdot Y_1+(1-4\cdot u+3\cdot u^2)\cdot \Delta Y_1+\\(2\cdot u-2\cdot u^2)\cdot Y_2+(2\cdot u-3\cdot u^2)\cdot \Delta Y_2]^2\ldots+\\[(-2\cdot u+2\cdot u^2)\cdot Z_1+(1-4\cdot u+3\cdot u^2)\cdot \Delta Z_1+\\(2\cdot u-2\cdot u^2)\cdot Z_2+(2\cdot u-3\cdot u^2)\cdot \Delta Z_2]^2\end{array}}},$$

$$\sin(\Psi) = \frac{\begin{array}{l}(-2\cdot u+2\cdot u^2)\cdot Y_1+(1-4\cdot u+3\cdot u^2)\cdot \Delta Y_1+\\(2\cdot u-2\cdot u^2)\cdot Y_2+(2\cdot u-3\cdot u^2)\cdot \Delta Y_2\end{array}}{\sqrt{\begin{array}{l}[(-2\cdot u+2\cdot u^2)\cdot X_1+(1-4\cdot u+3\cdot u^2)\cdot \Delta X_1+\\(2\cdot u-2\cdot u^2)\cdot X_2+(2\cdot u-3\cdot u^2)\cdot \Delta X_2]^2\ldots+\\[(-2\cdot u+2\cdot u^2)\cdot Y_1+(1-4\cdot u+3\cdot u^2)\cdot \Delta Y_1+\\(2\cdot u-2\cdot u^2)\cdot Y_2+(2\cdot u-3\cdot u^2)\cdot \Delta Y_2]^2\ldots+\\[(-2\cdot u+2\cdot u^2)\cdot Z_1+(1-4\cdot u+3\cdot u^2)\cdot \Delta Z_1+\\(2\cdot u-2\cdot u^2)\cdot Z_2+(2\cdot u-3\cdot u^2)\cdot \Delta Z_2]^2\end{array}}},$$

$$\tan(\Psi) = \frac{\begin{array}{l}(-2\cdot u+2\cdot u^2)\cdot Y_1+(1-4\cdot u+3\cdot u^2)\cdot \Delta Y_1+\\(2\cdot u-2\cdot u^2)\cdot Y_2+(2\cdot u-3\cdot u^2)\cdot \Delta Y_2\end{array}}{\begin{array}{l}(-2\cdot u+2\cdot u^2)\cdot X_1+(1-4\cdot u+3\cdot u^2)\cdot \Delta X_1+\\(2\cdot u-2\cdot u^2)\cdot X_2+(2\cdot u-3\cdot u^2)\cdot \Delta X_2\end{array}}, \text{ and}$$

$$\sin(\gamma) = \frac{\begin{array}{l}(-2\cdot u+2\cdot u^2)\cdot Z_1+(1-4\cdot u+3\cdot u^2)\cdot \Delta Z_1+\\(2\cdot u-2\cdot u^2)\cdot Z_2+(2\cdot u-3\cdot u^2)\cdot \Delta Z_2\end{array}}{\sqrt{\begin{array}{l}[(-2\cdot u+2\cdot u^2)\cdot X_1+(1-4\cdot u+3\cdot u^2)\cdot \Delta X_1+\\(2\cdot u-2\cdot u^2)\cdot X_2+(2\cdot u-3\cdot u^2)\cdot \Delta X_2]^2\ldots+\\[(-2\cdot u+2\cdot u^2)\cdot Y_1+(1-4\cdot u+3\cdot u^2)\cdot \Delta Y_1+\\(2\cdot u-2\cdot u^2)\cdot Y_2+(2\cdot u-3\cdot u^2)\cdot \Delta Y_2]^2\ldots+\\[(-2\cdot u+2\cdot u^2)\cdot Z_1+(1-4\cdot u+3\cdot u^2)\cdot \Delta Z_1+\\(2\cdot u-2\cdot u^2)\cdot Z_2+(2\cdot u-3\cdot u^2)\cdot \Delta Z_2]^2\end{array}}}.$$

The formulae provided and described above assume that the vehicle accurately follows the intended path, course, or route. It is unlikely that accurate path trajectory is achieved in practical applications. Rather, a vehicle is likely to be disturbed from the intended path. Thus, a guidance system must be capable of accounting for such deviations and generating correction guidance commands to bring the vehicle back to the path.

Accordingly, because a vehicle may be disturbed from an intended path, the deviation results in an actual position or current location of the vehicle and an ideal or current position along the path or commanded position along the path. The position vector from the path to the actual position of the vehicle may be represented by $r_u = P - B(u)$. Substituting for P and B(u) results in a solution represented by $$r_u = \begin{bmatrix} X + - \begin{bmatrix} (3\cdot \Delta X_1+2\cdot X_1-2\cdot X_2-3\cdot \Delta X_2)\cdot u^3 \ldots + \\ (-3\cdot X_1+3\cdot X_2-6\cdot \Delta X_1+3\cdot \Delta X_2)\cdot u^2 + \\ 3\cdot \Delta X_1\cdot u + X_1 \end{bmatrix} \\ Y + - \begin{bmatrix} (3\cdot \Delta Y_1+2\cdot Y_1-2\cdot Y_2-3\cdot \Delta Y_2)\cdot u^3 \ldots + \\ (-3\cdot Y_1+3\cdot Y_2-6\cdot \Delta Y_1+3\cdot \Delta Y_2)\cdot u^2 + \\ 3\cdot \Delta Y_1\cdot u + Y_1 \end{bmatrix} \\ Z + - \begin{bmatrix} (3\cdot \Delta Z_1+2\cdot Z_1-2\cdot Z_2-3\cdot \Delta Z_2)\cdot u^3 \ldots + \\ (-3\cdot Z_1+3\cdot Z_2-6\cdot \Delta Z_1+3\cdot \Delta Z_2)\cdot u^2 + \\ 3\cdot \Delta Z_1\cdot u + Z_1 \end{bmatrix} \end{bmatrix}.$$

From the actual position of the vehicle and the position vector from that position to the path, the ideal or current position along the path may be defined by the point on the curve where the position vector to the actual position of the vehicle is perpendicular to the path, represented by $$r_u^T \cdot \frac{d}{du}P(u) = 0$$

where $r_u^T$ represents the transpose of $r_u$.

From before, $$P(u) = \begin{bmatrix} (3\cdot \Delta X_1+2\cdot X_1-2\cdot X_2-3\cdot \Delta X_2)\cdot u^3 + \\ (-3\cdot X_1+3\cdot X_2-6\cdot \Delta X_1+3\cdot \Delta X_2)\cdot \\ u^2 + 3\cdot \Delta X_1\cdot u + X_1 \\ (3\cdot \Delta Y_1+2\cdot Y_1-2\cdot Y_2-3\cdot \Delta Y_2)\cdot u^3 + \\ (-3\cdot Y_1+3\cdot Y_2-6\cdot \Delta Y_1+3\cdot \Delta Y_2)\cdot \\ u^2 + 3\cdot \Delta Y_1\cdot u + Y_1 \\ (3\cdot \Delta Z_1+2\cdot Z_1-2\cdot Z_2-3\cdot \Delta Z_2)\cdot u^3 + \\ (-3\cdot Z_1+3\cdot Z_2-6\cdot \Delta Z_1+3\cdot \Delta Z_2)\cdot \\ u^2 + 3\cdot \Delta Z_1\cdot u + Z_1 \end{bmatrix},$$

-continued $$\frac{d}{du}P_u = \begin{bmatrix} 3 \cdot (3 \cdot \Delta X_1 + 2 \cdot X_1 - 2 \cdot X_2 - 3 \cdot \Delta X_2) \cdot \\ u^2 + 2 \cdot \\ (-3 \cdot X_1 + 3 \cdot X_2 - 6 \cdot \Delta X_1 + 3 \cdot \Delta X_2) \cdot \\ u + 3 \cdot \Delta X_1 \\ 3 \cdot (3 \cdot \Delta Y_1 + 2 \cdot Y_1 - 2 \cdot Y_2 - 3 \cdot \Delta Y_2) \cdot \\ u^2 + 2 \cdot \\ (-3 \cdot Y_1 + 3 \cdot Y_2 - 6 \cdot \Delta Y_1 + 3 \cdot \Delta Y_2) \cdot \\ u + 3 \cdot \Delta Y_1 \\ 3 \cdot (3 \cdot \Delta Z_1 + 2 \cdot Z_1 - 2 \cdot Z_2 - 3 \cdot \Delta Z_2) \cdot \\ u^2 + 2 \cdot \\ (-3 \cdot Z_1 + 3 \cdot Z_2 - 6 \cdot \Delta Z_1 + 3 \cdot \Delta Z_2) \cdot \\ u + 3 \cdot \Delta Z_1 \end{bmatrix}, \text{ and}$$

$$r_u = \begin{bmatrix} X + -\begin{bmatrix} (3 \cdot \Delta X_1 + 2 \cdot X_1 - 2 \cdot X_2 - 3 \cdot \Delta X_2) \cdot u^3 + \\ (-3 \cdot X_1 + 3 \cdot X_2 - 6 \cdot \Delta X_1 + 3 \cdot \Delta X_2) \cdot u^2 \ldots + \\ 3 \cdot \Delta X_1 \cdot u + X_1 \end{bmatrix} \\ Y + -\begin{bmatrix} (3 \cdot \Delta Y_1 + 2 \cdot Y_1 - 2 \cdot Y_2 - 3 \cdot \Delta Y_2) \cdot u^3 + \\ (-3 \cdot Y_1 + 3 \cdot Y_2 - 6 \cdot \Delta Y_1 + 3 \cdot \Delta Y_2) \cdot u^2 \ldots + \\ 3 \cdot \Delta Y_1 \cdot u + Y_1 \end{bmatrix} \\ Z + -\begin{bmatrix} (3 \cdot \Delta Z_1 + 2 \cdot Z_1 - 2 \cdot Z_2 - 3 \cdot \Delta Z_2) \cdot u^3 + \\ (-3 \cdot Z_1 + 3 \cdot Z_2 - 6 \cdot \Delta Z_1 + 3 \cdot \Delta Z_2) \cdot u^2 \ldots + \\ 3 \cdot \Delta Z_1 \cdot u + Z_1 \end{bmatrix} \end{bmatrix}.$$

Substituting where $a_X = 3 \cdot \Delta X_1 + 2 \cdot X_1 - 2 \cdot X_2 - 3 \cdot \Delta X_2,$ $b_X = -3 \cdot X_1 + 3 \cdot X_2 - 6 \cdot \Delta X_1 + 3 \cdot \Delta X_2,$ $c_X = 9 \cdot \Delta X_1 + 6 \cdot X_1 - 6 \cdot X_2 - 9 \cdot \Delta X_2,$ $d_X = -6 \cdot X_1 + 6 \cdot X_2 - 12 \cdot \Delta X_1 + 6 \cdot \Delta X_2,$ $a_Y = 3 \cdot \Delta Y_1 + 2 \cdot Y_1 - 2 \cdot Y_2 - 3 \cdot \Delta Y_2,$ $b_Y = -3 \cdot Y_1 + 3 \cdot Y_2 - 6 \cdot \Delta Y_1 + 3 \cdot \Delta Y_2,$ $c_Y = 9 \cdot \Delta Y_1 + 6 \cdot Y_1 - 6 \cdot Y_2 - 9 \cdot \Delta Y_2,$ $d_Y = -6 \cdot Y_1 + 6 \cdot Y_2 - 12 \cdot \Delta Y_1 + 6 \cdot \Delta Y_2,$ $a_Z = 3 \cdot \Delta Z_1 + 2 \cdot Z_1 - 2 \cdot Z_2 - 3 \cdot \Delta Z_2,$ $b_Z = -3 \cdot Z_1 + 3 \cdot Z_2 - 6 \cdot \Delta Z_1 + 3 \cdot \Delta Z_2,$ $c_Z = 9 \cdot \Delta Z_1 + 6 \cdot Z_1 - 6 \cdot Z_2 - 9 \cdot \Delta Z_2,$ and $d_Z = -6 \cdot Z_1 + 6 \cdot Z_2 - 12 \cdot \Delta Z_1 + 6 \cdot \Delta Z_2$ yields the representative solution for the ideal position along the path as $$\begin{bmatrix} X + -\begin{pmatrix} a_X \cdot u^3 + b_X \cdot u^2 \ldots + \\ 3 \cdot \Delta X_1 \cdot u + X_1 \end{pmatrix} \\ Y + -\begin{pmatrix} a_Y \cdot u^3 + b_Y \cdot u^2 \ldots + \\ 3 \cdot \Delta Y_1 \cdot u + Y_1 \end{pmatrix} \\ Z + -\begin{pmatrix} a_Z \cdot u^3 + b_Z \cdot u^2 \ldots + \\ 3 \cdot \Delta Z_1 \cdot u + Z_1 \end{pmatrix} \end{bmatrix}^T \cdot \begin{bmatrix} c_X \cdot u^2 + d_X \cdot u + 3 \cdot \Delta X_1 \\ c_Y \cdot u^2 + d_Y \cdot u + 3 \cdot \Delta Y_1 \\ c_Z \cdot u^2 + d_Z \cdot u + 3 \cdot \Delta Z_1 \end{bmatrix} = 0.$$

Evaluating and collecting powers of u from the previous equation yields a quintic polynomial that can be solved for residual. When the path is kinked into a sharp loop, there could be a point in the middle of the loop that satisfies the normal vector criterion at five distinct points. However, the intent is to solve for the ideal position along the path. The resulting quintic polynomial may be represented by $(-a_Z \cdot c_Z - a_X \cdot c_X - a_Y \cdot c_Y) \cdot u^5 \ldots +$ $(-b_Y \cdot c_Y - a_Y \cdot d_Y - b_X \cdot c_X \cdot a_Z \cdot d_Z - b_Z \cdot c_Z - a_X \cdot d_X) \cdot u^4$ $$\ldots + \begin{bmatrix} (-3 \cdot a_X - 3 \cdot c_X) \cdot \Delta X_1 + (-3 \cdot c_Y - 3 \cdot a_Y) \cdot \Delta Y_1 + \\ (-3 \cdot c_Z - 3 \cdot a_Z) \cdot \Delta Z_1 \ldots + \\ -b_Y \cdot d_Y - b_Z \cdot d_Z - b_X \cdot d_X \end{bmatrix} \cdot u^3$ $$\ldots + \begin{bmatrix} (-3 \cdot d_X - 3 \cdot b_X) \cdot \Delta X_1 + (-3 \cdot d_Y - 3 \cdot b_Y) \cdot \Delta Y_1 + \\ (-3 \cdot d_Z - 3 \cdot b_Z) \cdot \Delta Z_1 \ldots \\ + -Z_1 \cdot c_Z - Y_1 \cdot c_Y + X \cdot c_X - X_1 \cdot c_X + Y \cdot c_Y + Z \cdot c_Z \end{bmatrix} \cdot u^2 \ldots +$ $(-9 \cdot \Delta X_1^2 + Y \cdot d_Y - Z_1 \cdot d_Z - X_1 \cdot d_X - 9 \cdot \Delta Z_1^2 + Z \cdot d_Z -$ $Y_1 \cdot d_Y + X \cdot d_X - 9 \cdot \Delta Y_1^2) \cdot u \ldots + 3 \cdot X \cdot \Delta X_1 +$ $3 \cdot Y \cdot \Delta Y_1 - 3 \cdot X_1 \cdot \Delta X_1 - 3 \cdot Y_1 \cdot \Delta Y_1 - 3 \cdot Z_1 \cdot \Delta Z_1 + 3 \cdot Z \cdot \Delta Z_1 = 0.$ Substituting, collecting variables, and setting the quintic equal to residual provides the ability to determine u, or at least attempt to determine u. For example, the current u is the first real root which is greater than the previous u, and u is limited to the interval from the previous u to 1. One of ordinary skill in the art will recognize that the first three coefficients are independent of present position, and may be pre-computed. The representative solution is $$\begin{bmatrix} -3 \cdot (-3 \cdot \Delta X_1 + 3 \cdot \\ \Delta X_2 - 2 \cdot X_1 + 2 \cdot X_2)^2 \ldots + \\ -3 \cdot (3 \cdot \Delta Y_2 - 3 \cdot \\ \Delta Y_1 - 2 \cdot Y_1 + 2 \cdot Y_2)^2 \ldots + \\ -3 \cdot (3 \cdot \Delta Z_2 - 3 \cdot \\ \Delta Z_1 - 2 \cdot Z_1 + 2 \cdot Z_2)^2 \end{bmatrix} \cdot u^5$$

$$\ldots + \begin{bmatrix} 15 \cdot (3 \cdot \Delta X_2 + 2 \cdot X_2 - 3 \cdot \Delta X_1 - 2 \cdot X_1) \cdot \\ (\Delta X_2 + X_2 - 2 \cdot \Delta X_1 - X_1) \ldots + \\ 15 \cdot (3 \cdot \Delta Y_2 - 2 \cdot Y_1 - 3 \cdot \Delta Y_1 + 2 \cdot Y_2) \cdot \\ (\Delta Y_2 - Y_1 - 2 \cdot \Delta Y_1 + Y_2) \ldots + \\ 15 \cdot (3 \cdot \Delta Z_2 - 2 \cdot Z_1 - 3 \cdot \Delta Z_1 + 2 \cdot Z_2) \cdot \\ (\Delta Z_2 - Z_1 - 2 \cdot \Delta Z_1 + Z_2) \end{bmatrix} \cdot u^4$ -continued $$\ldots + \begin{bmatrix} -(-3 \cdot X_1 + 3 \cdot X_2 - 6 \cdot \Delta X_1 + 3 \cdot \Delta X_2) \cdot \\ (-6 \cdot X_1 + 6 \cdot X_2 - 12 \cdot \Delta X_1 + 6 \cdot \Delta X_2) \ldots + \\ 12 \cdot \Delta X_1 \cdot (-3 \cdot \Delta X_1 - 2 \cdot X_1 + 2 \cdot X_2 + 3 \cdot \Delta X_2) \ldots \\ -(-3 \cdot Y_1 + 3 \cdot Y_2 - 6 \cdot \Delta Y_1 + 3 \cdot \Delta Y_2) \cdot \\ (-6 \cdot Y_1 + 6 \cdot Y_2 - 12 \cdot \Delta Y_1 + 6 \cdot \Delta Y_2) \ldots + \\ 12 \cdot \Delta Y_1 \cdot (-3 \cdot \Delta Y_1 - 2 \cdot Y_1 + 2 \cdot Y_2 + 3 \cdot \Delta Y_2) \ldots + \\ -(-3 \cdot Z_1 + 3 \cdot Z_2 - 6 \cdot \Delta Z_1 + 3 \cdot \Delta Z_2) \cdot \\ (-6 \cdot Z_1 + 6 \cdot Z_2 - 12 \cdot \Delta Z_1 + 6 \cdot \Delta Z_2) \ldots + \\ 12 \cdot \Delta Z_1 \cdot (-3 \cdot \Delta Z_1 - 2 \cdot Z_1 + 2 \cdot Z_2 + 3 \cdot \Delta Z_2) \end{bmatrix} \cdot u^3 \ldots$$

$$+ \begin{bmatrix} (9 \cdot \Delta X_1 + 6 \cdot X_1 - 6 \cdot X_2 - 9 \cdot \Delta X_2) \cdot \\ (X - X_1) + -27 \cdot \Delta X_1 \cdot \\ (-2 \cdot \Delta X_1 - X_1 + X_2 + \Delta X_2) \ldots + \\ (9 \cdot \Delta Y_1 + 6 \cdot Y_1 - 6 \cdot Y_2 - 9 \cdot \Delta Y_2) \cdot \\ (Y - Y_1) + -27 \cdot \Delta Y_1 \cdot \\ (-2 \cdot \Delta Y_1 - Y_1 + Y_2 + \Delta Y_2) \ldots + \\ (9 \cdot \Delta Z_1 + 6 \cdot Z_1 - 6 \cdot Z_2 - 9 \cdot \Delta Z_2) \cdot \\ (Z - Z_1) + -27 \cdot \Delta Z_1 \cdot \\ (-2 \cdot \Delta Z_1 - Z_1 + Z_2 + \Delta Z_2) \end{bmatrix} \cdot u^2 \ldots$$

$$+ \begin{bmatrix} (-6 \cdot X_1 + 6 \cdot X_2 - 12 \cdot \Delta X_1 + 6 \cdot \Delta X_2) \cdot (X - X_1) - 9 \cdot \Delta X_1^2 \ldots \\ (-6 \cdot Y_1 + 6 \cdot Y_2 - 12 \cdot \Delta Y_1 + 6 \cdot \Delta Y_2) \cdot (Y - Y_1) - 9 \cdot \Delta Y_1^2 \ldots \\ (-6 \cdot Z_1 + 6 \cdot Z_2 - 12 \cdot \Delta Z_1 + 6 \cdot \Delta Z_2) \cdot (Z - Z_1) - 9 \cdot \Delta Z_1^2 \end{bmatrix} \cdot u$$

$$\ldots + 3 \cdot (X - X_1) \cdot \Delta X_1 + 3 \cdot (Y - Y_1) \cdot \Delta Y_1 + 3 \cdot (Z - Z_1) \cdot \Delta Z_1 = res.$$

The slope of the residual (res), represented by $$\frac{d}{dres} u = 5 \cdot \begin{bmatrix} -3 \cdot (-3 \cdot \Delta X_1 + 3 \cdot \Delta X_2 - 2 \cdot X_1 + 2 \cdot X_2)^2 \ldots + \\ -3 \cdot (3 \cdot \Delta Y_2 - 3 \cdot \Delta Y_1 - 2 \cdot Y_1 + 2 \cdot Y_2)^2 \ldots + \\ -3 \cdot (3 \cdot \Delta Z_2 - 3 \cdot \Delta Z_1 - 2 \cdot Z_1 + 2 \cdot Z_2)^2 \end{bmatrix} \cdot u^4 \ldots +$$

$$4 \cdot \begin{bmatrix} 15 \cdot (3 \cdot \Delta X_2 + 2 \cdot X_2 - 3 \cdot \Delta X_1 - 2 \cdot X_1) \cdot \\ (\Delta X_2 + X_2 - 2 \cdot \Delta X_1 - X_1) \ldots + \\ 15 \cdot (3 \cdot \Delta Y_2 - 2 \cdot Y_1 - 3 \cdot \Delta Y_1 + 2 \cdot Y_2) \cdot \\ (\Delta Y_2 - Y_1 - 2 \cdot \Delta Y_1 + Y_2) \ldots + \\ 15 \cdot (3 \cdot \Delta Z_2 - 2 \cdot Z_1 - 3 \cdot \Delta Z_1 + 2 \cdot Z_2) \cdot \\ (\Delta Z_2 - Z_1 - 2 \cdot \Delta Z_1 + Z_2) \end{bmatrix} \cdot u^3 \ldots +$$

$$3 \cdot \begin{bmatrix} -(-3 \cdot X_1 + 3 \cdot X_2 - 6 \cdot \Delta X_1 + 3 \cdot \Delta X_2) \cdot \\ (-6 \cdot X_1 + 6 \cdot X_2 - 12 \cdot \Delta X_1 + 6 \cdot \Delta X_2) \ldots + \\ 12 \cdot \Delta X_1 \cdot (-3 \cdot \Delta X_1 - 2 \cdot X_1 + 2 \cdot X_2 + 3 \cdot \Delta X_2) \ldots + \\ -(-3 \cdot Y_1 + 3 \cdot Y_2 - 6 \cdot \Delta Y_1 + 3 \cdot \Delta Y_2) \cdot \\ (-6 \cdot Y_1 + 6 \cdot Y_2 - 12 \cdot \Delta Y_1 + 6 \cdot \Delta Y_2) \ldots + \\ 12 \cdot \Delta Y_1 \cdot (3 \cdot \Delta Y_1 - 2 \cdot Y_1 + 2 \cdot Y_2 + 3 \cdot \Delta Y_2) \ldots + \\ -(-3 \cdot Z_1 + 3 \cdot Z_2 - 6 \cdot \Delta Z_1 + 3 \cdot \Delta Z_2) \cdot \\ (-6 \cdot Z_1 + 6 \cdot Z_2 - 12 \cdot \Delta Z_1 + 6 \cdot \Delta Z_2) \ldots + \\ 12 \cdot \Delta Z_1 \cdot (-3 \cdot \Delta Z_1 - 2 \cdot Z_1 + 2 \cdot Z_2 + 3 \cdot \Delta Z_2) \end{bmatrix} \cdot u^2 \ldots +$$

-continued $$2 \cdot \begin{bmatrix} (9 \cdot \Delta X_1 + 6 \cdot X_1 - 6 \cdot X_2 - 9 \cdot \Delta X_2) \cdot \\ (X - X_1) + -27 \cdot \Delta X_1 \cdot \\ (-2 \cdot \Delta X_1 - X_1 + X_2 + \Delta X_2) \ldots + \\ (\cdot \Delta Y_1 + 6 \cdot Y_1 - 6 \cdot Y_2 - 9 \cdot \Delta Y_2) \cdot \\ (Y - Y_1) + -27 \cdot \Delta Y_1 \cdot \\ (-2 \cdot \Delta Y_1 - Y_1 + Y_2 + \Delta Y_2) \ldots + \\ (9 \cdot \Delta Z_1 + 6 \cdot Z_1 - 6 \cdot Z_2 - 9 \cdot \Delta Z_2) \cdot \\ (Z - Z_1) + -27 \cdot \Delta Z_1 \cdot \\ (-2 \cdot \Delta Z_1 - Z_1 + Z_2 + \Delta Z_2) \end{bmatrix} \cdot u$$

$$\ldots + \begin{bmatrix} (-6 \cdot X_1 + 6 \cdot X_2 - 12 \cdot \Delta X_1 + 6 \cdot \Delta X_2) \cdot (X - X_1) - 9 \cdot \Delta X_1^2 \ldots + \\ (-6 \cdot Y_1 + 6 \cdot Y_2 - 12 \cdot \Delta Y_1 + 6 \cdot \Delta Y_2) \cdot (Y - Y_1) - 9 \cdot \Delta Y_1^2 \ldots + \\ (-6 \cdot Z_1 + 6 \cdot Z_2 - 12 \cdot \Delta Z_1 + 6 \cdot \Delta Z_2) \cdot (Z - Z_1) - 9 \cdot \Delta Z_1^2 \end{bmatrix},$$

may be used in Newton's method. Newton's method or iteration may be used to find the root to derive the ideal position along the path. Given an initial u, an improved u may be found by extrapolating the residual to zero, as shown below. Possibilities for the initial u include the value of u at a previous time, dead reckoning (u'=u+du/dt Δt), and the relative straight-line distance of the actual position of the vehicle between the previous and current waypoints. Thus, the iteration is represented as $$u' = u - \frac{res}{\frac{d}{du} res}.$$

A further step in the guidance routine of this example embodiment involves determining when the vehicle has passed the current waypoint such that the previous waypoint in the sequence may be ignored, the current waypoint just passed becomes the new previous waypoint, the current next waypoint becomes the new current waypoint, and the waypoint following in the sequence becomes the new next waypoint. This process may be referred to as waypoint sequencing based on actual position, and, possibly, commanded course and angle in a more precise application. There are multiple ways of determining when a vehicle has passed the current waypoint. One way is to sequence waypoints when the current waypoint is abeam. The vehicle is past the current waypoint when $(X-X_2) \cdot \Delta X_2 + (Y-Y_2) \cdot \Delta Y_2 + (Z-Z_2) \cdot \Delta Z_2 < 0$. The vehicle is between waypoints when $(X-X_1) \cdot \Delta X_1 + (Y-Y_1) \cdot \Delta Y_1 + (Z-Z_1) \cdot \Delta Z_1 \geq 0$ and $(X-X_2) \cdot \Delta X_2 + (Y-Y_2) \cdot \Delta Y_2 + (Z-Z_2) \cdot \Delta Z_2 \leq 0$. If neither condition is true, the position with respect to the segment may be ambiguous, such as where the vehicle is at a position where normal vectors from waypoints have crossed and the vehicle is simultaneously before the first waypoint and past the second waypoint. In such a case, one of ordinary skill in the art may employ the commanded course and angle to better determine waypoint sequencing.

A final step in the guidance routine for fixed waypoints of this example embodiment of the present invention involves determining crosstrack (xtk) regulation for generating guidance commands to bring a disturbed vehicle back to the path. Traditionally, this has been done using a feedback regulator, with a proportional gain on crosstrack error.

The guidance commands for crosstrack gain are related to both the lead time and the variance of the current position from the Bezier curve path. In this example embodiment of the present invention, the crosstrack gain is expressed as a lead time $\Delta t$ along the path. The smaller the lead time or the greater the variance off the path, the higher the effective crosstrack gain, meaning the more aggressively the guidance commands will attempt to correct back to the path, or, more specifically, to correct back towards the leading or target position along the path defined by the lead time. The greater the lead time or the smaller the variance off the path, the less aggressively the guidance commands will attempt to correct back to the path. This creates an asymptotical corrective, commanded guidance path where the corrective guidance commands approach right angles to the path at extremely small lead times or large variance off the path and where the corrective guidance commands approach a tangent to the path. The result is a smooth pursuit capture of the desired path. For example, if the disturbance were due to being blown off the path by a strong crosswind, an aircraft could essentially fly into the wind until back to the path and then progress along the path while angled or crabbed into the wind to maintain a course along the path.

Further, waypoint sequencing is required where the leading or target point passes the current waypoint which occurs when $u+\Delta u>1$. The following equation may be used to determine $\Delta u$ and, in turn, to determine if the leading or target point has passed the current waypoint:

$$\Delta u = \Delta t \cdot \frac{d}{dt} u,$$

substituting for du/dt to derive $$\Delta u = \frac{V_i \cdot \Delta t}{3 \cdot \sqrt{\begin{array}{l}[(-2 \cdot u + 2 \cdot u^2) \cdot X_1 + (1 - 4 \cdot u + 3 \cdot u^2) \cdot \Delta X_1 + \\ (2 \cdot u - 2 \cdot u^2) \cdot X_2 + (2 \cdot u - 3 \cdot u^2) \cdot \Delta X_2]^2 \ldots + \\ [(-2 \cdot u + 2 \cdot u^2) \cdot Y_1 + (1 - 4 \cdot u + 3 \cdot u^2) \cdot \Delta Y_1 + \\ (2 \cdot u - 2 \cdot u^2) \cdot Y_2 + (2 \cdot u - 3 \cdot u^2) \cdot \Delta Y_2]^2 \ldots + \\ [(-2 \cdot u + 2 \cdot u^2) \cdot Z_1 + (1 - 4 \cdot u + 3 \cdot u^2) \cdot \Delta Z_1 + \\ (2 \cdot u - 2 \cdot u^2) \cdot Z_2 + (2 \cdot u - 3 \cdot u^2) \cdot \Delta Z_2]^2 \end{array}}}.$$

If $u+\Delta u>1$, then waypoint sequencing occurs.

Returning to the crosstrack regulation and associated guidance commands, the commanded or ideal position along the path is represented by $$P_c(u) = \begin{bmatrix} (3 \cdot \Delta X_1 + 2 \cdot X_1 - 2 \cdot X_2 - 3 \cdot \Delta X_2) \cdot (u + \Delta u)^3 \ldots + \\ (-3 \cdot X_1 + 3 \cdot X_2 - 6 \cdot \Delta X_1 + 3 \cdot \Delta X_2) \cdot (u + \Delta u)^2 \ldots \\ + 3 \cdot \Delta X_1 \cdot (u + \Delta u) + X_1 \\ (3 \cdot \Delta Y_1 + 2 \cdot Y_1 - 2 \cdot Y_2 - 3 \cdot \Delta Y_2) \cdot (u + \Delta u)^3 \ldots + \\ (-3 \cdot Y_1 + 3 \cdot Y_2 - 6 \cdot \Delta Y_1 + 3 \cdot \Delta Y_2) \cdot (u + \Delta u)^2 \ldots \\ + 3 \cdot \Delta Y_1 \cdot (u + \Delta u) + Y_1 \\ (3 \cdot \Delta Z_1 + 2 \cdot Z_1 - 2 \cdot Z_2 - 3 \cdot \Delta Z_2) \cdot (u + \Delta u)^3 \ldots + \\ (-3 \cdot Z_1 + 3 \cdot Z_2 - 6 \cdot \Delta Z_1 + 3 \cdot \Delta Z_2) \cdot (u + \Delta u)^2 \ldots \\ + 3 \cdot \Delta Z_1 \cdot (u + \Delta u) + Z_1 \end{bmatrix}.$$

The commanded course from the actual position is determined by $$\tan(\Psi_c) = \frac{\begin{bmatrix} (3 \cdot \Delta Y_1 + 2 \cdot Y_1 - 2 \cdot Y_2 - 3 \cdot \Delta Y_2) \cdot (u + \Delta u)^3 \ldots + \\ (-3 \cdot Y_1 + 3 \cdot Y_2 - 6 \cdot \Delta Y_1 + 3 \cdot \Delta Y_2) \cdot (u + \Delta u)^2 \ldots \\ + 3 \cdot \Delta Y_1 \cdot (u + \Delta u) + Y_1 - Y \end{bmatrix}}{\begin{bmatrix} (3 \cdot \Delta X_1 + 2 \cdot X_1 - 2 \cdot X_2 - 3 \cdot \Delta X_2) \cdot (u + \Delta u)^3 \ldots + \\ (-3 \cdot X_1 + 3 \cdot X_2 - 6 \cdot \Delta X_1 + 3 \cdot \Delta X_2) \cdot (u + \Delta u)^2 \ldots \\ + 3 \cdot \Delta X_1 \cdot (u + \Delta u) + X_1 - X \end{bmatrix}}.$$

And the commanded angle, or glidepath angle, is determined by $$\tan(\gamma_c) = \frac{\begin{bmatrix} (3 \cdot \Delta Z_1 + 2 \cdot Z_1 - 2 \cdot Z_2 - 3 \cdot \Delta Z_2) \cdot (u + \Delta u)^3 \ldots + \\ (-3 \cdot Z_1 + 3 \cdot Z_2 - 6 \cdot \Delta Z_1 + 3 \cdot \Delta Z_2) \cdot (u + \Delta u)^2 \ldots \\ + 3 \cdot \Delta Z_1 \cdot (u + \Delta u) + Z_1 \end{bmatrix}}{\sqrt{\begin{array}{l}\begin{bmatrix} (3 \cdot \Delta X_1 + 2 \cdot X_1 - 2 \cdot X_2 - 3 \cdot \Delta X_2) \cdot (u + \Delta u)^3 \ldots + \\ (-3 \cdot X_1 + 3 \cdot X_2 - 6 \cdot \Delta X_1 + 3 \cdot \Delta X_2) \cdot (u + \Delta u)^2 + \\ 3 \cdot \Delta X_1 \cdot (u + \Delta u) + X_1 \end{bmatrix}^2 \ldots + \\ \begin{bmatrix} (3 \cdot \Delta Y_1 + 2 \cdot Y_1 - 2 \cdot Y_2 - 3 \cdot \Delta Y_2) \cdot (u + \Delta u)^3 \ldots + \\ (-3 \cdot Y_1 + 3 \cdot Y_2 - 6 \cdot \Delta Y_1 + 3 \cdot \Delta Y_2) \cdot (u + \Delta u)^2 + \\ 3 \cdot \Delta Y_1 \cdot (u + \Delta u) + Y_1 \end{bmatrix}^2 \end{array}}}.$$

As described initially with reference to this example embodiment, the formulae provided and described above assume that waypoints are fixed. However, numerous applications require use of at least one moving waypoint. For example, rendezvous scenarios often involve a moving vehicle, such as aerial refueling where the tanker aircraft is moving. Rendezvous with a tanker can be accomplished by putting a waypoint at a precontact position. As the tanker flies around the refueling track, the flightpath guidance will be automatically and continuously updated to smoothly intercept the tanker from the proper direction. Further examples involving moving waypoints include carrier landing and takeoff, multi-vehicle formation movement, and remote tracking such as acquiring a moving surveillance target. Landing on an aircraft carrier may be accomplished by attaching a moving waypoint to the carrier. A curved flightpath will bring the commanded aircraft to the carrier, aligned down the angled deck, despite the motion of the carrier. And formation flying can be accomplished simply by placing a waypoint off the wing of the lead aircraft and flying to that waypoint. Many applications will involve both fixed and moving waypoints, such as mission route planning involving a fixed takeoff runway, a moving refueling tanker, and a fixed landing runway.

A conceptually difficult aspect of the present invention may be that even after passing through a moving waypoint, the movement of the previous waypoint remains a parameter in the continued guidance to the current waypoint. Both the previous and current waypoint movements are accounted for in the guidance routines. An example where movement of the previous waypoint affects guidance of a vehicle is a carrier approach and landing. The landing pattern or path may be defined by a waypoint on the deck of the carrier and at least another waypoint along the approach path to the carrier that is lined up with the angled deck, or linear with the runway on the carrier. It is not sufficient merely to intercept the waypoint on the deck. The aircraft must approach the waypoint on the deck from the proper angle where the aircraft is lined up with the deck so that when the aircraft touches down on the deck, the velocity of the aircraft is moving linearly along the runway of the deck and not at an angle to the runway. Instead, the movement of the previous waypoint or approach waypoint, which establishes the approach angle for the landing pattern, may be incorporated into guidance commands for landing the aircraft. Thus, rather than only the carrier moving, the reference frame for the whole landing pattern may move together, enabling a landing aircraft to maintain the proper approach angle to the carrier. A similar example is an aerial refueling pattern where the refueling aircraft ordinarily must approach the tanker at a capture angle, typically aligned behind or behind and offset from the tanker.

One of ordinary skill in the art will recognize from the previous description that mission route planning may incorporate determination of whether a waypoint is fixed or moving and, possibly, in what reference frame a waypoint is measured. For example, the approach waypoint in the carrier example is a moving waypoint, but is fixed in the reference frame of the carrier to produce the trailing or sweeping motion of the whole landing pattern. By comparison, a runway on the ground may be fixed in an inertial space reference frame. The description of a moving waypoint herein refers to a waypoint that is moving with respect to the reference frame in which the vehicle is measured. For example, if the vehicle is measured in an inertial space reference frame such as the Earth, an approach waypoint of a carrier is moving. If the vehicle is measured in the reference frame of the carrier, the approach waypoint is fixed, but preceding waypoints in the path sequence such as a ground takeoff runway would be moving if fixed in a different reference frame.

Rendezvous with a moving target is typically constrained by approaching the target from a given direction. Thus, departure and approach angles are more conveniently expressed in spherical coordinates relative to the orientation of a waypoint because the orientation will change but the desired angle of approach or departure relative to the waypoint is assumed fixed. This allows for the full six-degree-of-freedom motion of the waypoint; its angular orientation and rotation as well as its position and velocity in space. Accordingly, the angular orientation or azimuth and elevation angles, and changes thereto, may be included for moving waypoints. Respective control point parameters for a first or the pervious and a second or the current waypoint may be represented by:

$$\Delta X_1 = Rw_1 \cdot \cos(\Psi w_1 + \Delta\Psi w_1) \cdot \cos(\gamma w_1 \Delta\gamma w_1),$$

$$\Delta Y_1 = Rw_1 \cdot \sin(\Psi w_1 + \Delta\Psi w_1) \cdot \cos(\gamma w_1 + \Delta\gamma w_1),$$

$$\Delta Z_1 = Rw_1 \cdot \sin(\gamma w_1 \Delta\gamma w_1),$$

$$\Delta X_2 = Rw_2 \cdot \cos(\Psi w_2 + \Delta\Psi w_2) \cdot \cos(\gamma w_2 + \Delta\gamma w_2),$$

$$\Delta Y_2 = Rw_2 \cdot \sin(\Psi w_2 + \Delta\Psi w_2) \cdot \cos(\gamma w_2 + \Delta\gamma w_2), \text{ and}$$

$$\Delta Z_2 = Rw_2 \cdot \sin(\gamma w_2 + \Delta\gamma w_2).$$

Substituting into the original formula for the Bezier curve path geometry results in $$B(u) = \begin{bmatrix} (2 \cdot u + 1) \cdot (u-1)^2 \cdot X_1 + 3 \cdot u \cdot (u-1)^2 \cdot Rw_1 \cdot \\ \cos(\Psi w_1 + \Delta\Psi w_1) \cdot \cos(\gamma w_1 + \Delta\gamma w_1) \ldots + \\ -u^2 \cdot (-3 \cdot 2 \cdot u) \cdot X_2 + -3 \cdot u^2 \cdot (u-1) \cdot Rw_2 \cdot \\ \cos(\Psi w_2 + \Delta\Psi w_2) \cdot \cos(\gamma w_2 + \Delta\gamma w_2) \\ (2 \cdot u + 1) \cdot (u-1)^2 \cdot Y_1 + 3 \cdot u \cdot (u-1)^2 \cdot Rw_1 \cdot \\ \sin(\Psi w_1 + \Delta\Psi w_1) \cdot \cos(\gamma w_1 + \Delta\gamma w_1) \ldots + \\ -u^2 \cdot (-3 + 2 \cdot u) \cdot Y_2 + -3 \cdot u^2 \cdot (u-1) \cdot Rw_2 \cdot \\ \sin(\Psi w_2 + \Delta\Psi w_2) \cdot \cos(\gamma w_2 + \Delta\gamma w_2) \\ (2 \cdot u + 1) \cdot (u-1)^2 \cdot Z_1 + 3 \cdot u \cdot (u-1)^2 \cdot Rw_1 \cdot \\ \sin(\gamma w_1 + \Delta\gamma w_1) \ldots + \\ -u^2 \cdot (-3 + 2 \cdot u) \cdot Z_2 + -3 \cdot u^2 \cdot (u-1) \cdot Rw_2 \cdot \\ \sin(\gamma w_2 + \Delta\gamma w_2) \end{bmatrix} \text{ and}$$

$$\frac{d}{dt}B = \begin{bmatrix} -6 \cdot u \cdot (-X_1 + X_2) \cdot (u-1) \ldots + \\ [3 \cdot \cos(\Psi w_1 + \Delta\Psi w_1) \cdot \\ \cos(\gamma w_1 + \Delta\gamma w_1) \cdot (3 \cdot u - 1) \cdot (u-1)] \cdot Rw_1 \ldots + \\ [-3 \cdot u \cdot \cos(\Psi w_2 + \Delta\Psi w_2) \cdot \\ \cos(\gamma w_2 + \Delta\gamma w_2) \cdot (3 \cdot u - 2)] \cdot Rw_2 - \\ 6 \cdot u \cdot (u-1) \cdot (-Y_1 + Y_2) \ldots + \\ [3 \cdot \sin(\Psi w_1 + \Delta\Psi w_1) \cdot \\ \cos(\gamma w_1 + \Delta\gamma w_1) \cdot (3 \cdot u - 1) \cdot (u-1)] \cdot Rw_1 \ldots + \\ [-3 \cdot u \cdot \sin(\Psi w_2 + \Delta\Psi w_2) \cdot \\ \cos(\gamma w_2 + \Delta\gamma w_2) \cdot (3 \cdot u - 2)] \cdot Rw_2 - \\ 6 \cdot u \cdot (-Z_1 + Z_2) \cdot (u-1) \ldots + \\ [3 \cdot \sin(\gamma w_1 + \Delta\gamma w_1) \cdot (3 \cdot u - 1) \cdot (u-1)] \cdot Rw_1 \ldots + \\ [-3 \cdot u \cdot \sin(\gamma w_2 + \Delta\gamma w_2) \cdot (3 \cdot u - 2)] \cdot Rw_2 \end{bmatrix}.$$

The progress along the path, assuming the vehicle is on the path, may be solved by the vehicle velocity less the velocity of the directed tangent to the moving path, which may be represented by $$V = V_i \cdot \begin{bmatrix} \cos(\Psi) \cdot \cos(\gamma) \\ \sin(\Psi) \cdot \cos(\gamma) \\ \sin(\gamma) \end{bmatrix} \text{ and}$$

$$V = \frac{d}{dt}B \text{ where}$$

$$\frac{d}{dt}B = \left(\frac{d}{du}B\right) \cdot \frac{d}{dt}u + \left(\frac{d}{dP_1}B\right) \cdot \frac{d}{dt}P_1 + \left(\frac{d}{dP_2}B\right) \cdot \frac{d}{dt}P_2 \ldots +$$
$$\left(\frac{d}{d\Psi_1}B\right) \cdot \left(\frac{d}{dt}\Psi_1\right) \left(\frac{d}{d\Psi_2}B\right) \cdot \frac{d}{dt}\Psi_2 \ldots +$$
$$\left(\frac{d}{d\gamma_1}B\right) \cdot \left(\frac{d}{dt}\gamma_1\right) + \left(\frac{d}{d\gamma_2}B\right) \cdot \frac{d}{dt}\gamma_2, \text{ such that}$$

$$\begin{bmatrix} Vx_1 \\ Vy_1 \\ Vz_1 \end{bmatrix} = \frac{d}{dt}P_1 \text{ and}$$

$$\begin{bmatrix} Vx_2 \\ Vy_2 \\ Vz_2 \end{bmatrix} = \frac{d}{dt}P_2.$$

Expanding the velocity of the path results in $$\frac{d}{dt}B = \left(\frac{d}{du}B\right) \cdot \left(\frac{d}{dt}u\right) +$$

$$(2 \cdot u + 1) \cdot (u-1)^2 \cdot \begin{bmatrix} Vx_1 \\ Vy_1 \\ Vz_1 \end{bmatrix} + -u^2 \cdot (-3 + 2 \cdot u) \cdot \begin{bmatrix} Vx_2 \\ Vy_2 \\ Vz_2 \end{bmatrix} \ldots +$$

$$\begin{bmatrix} -3 \cdot u \cdot (u-1)^2 \cdot Rw_1 \cdot \sin(\Psi w_1 + \Delta \Psi w_1) \cdot \\ \cos(\gamma w_1 + \Delta \gamma w_1) \\ 3 \cdot u \cdot (u-1)^2 \cdot Rw_1 \cdot \cos(\Psi w_1 + \Delta \Psi w_1) \cdot \\ \cos(\gamma w_1 + \Delta \gamma w_1) \\ 0 \end{bmatrix} \cdot \left(\frac{d}{dt}\Psi_1\right) \ldots +$$

$$\begin{bmatrix} 3 \cdot u^2 \cdot (u-1) \cdot Rw_2 \cdot \sin(\Psi w_2 + \Delta \Psi w_2) \cdot \\ \cos(\gamma w_2 + \Delta \gamma w_2) \\ -3 \cdot u^2 \cdot (u-1) \cdot Rw_2 \cdot \cos(\Psi w_2 + \Delta \Psi w_2) \cdot \\ \cos(\gamma w_2 + \Delta \gamma w_2) \\ 0 \end{bmatrix} \cdot \left(\frac{d}{dt}\Psi_2\right) \ldots +$$

$$\begin{bmatrix} -3 \cdot u \cdot (u-1)^2 \cdot Rw_1 \cdot \cos(\Psi w_1 + \Delta \Psi w_1) \cdot \\ \sin(\gamma w_1 + \Delta \gamma w_1) \\ -3 \cdot u \cdot (u-1)^2 \cdot Rw_1 \cdot \sin(\Psi w_1 + \Delta \Psi w_1) \cdot \\ \sin(\gamma w_1 + \Delta \gamma w_1) \\ 3 \cdot u \cdot (u-1)^2 \cdot Rw_1 \cdot \cos(\gamma w_1 + \Delta \gamma w_1) \end{bmatrix} \cdot \left(\frac{d}{dt}\gamma_1\right) \ldots +$$

$$\begin{bmatrix} 3 \cdot u^2 \cdot (u-1) \cdot Rw_2 \cdot \cos(\Psi w_2 + \Delta \Psi w_2) \cdot \\ \sin(\gamma w_2 + \Delta \gamma w_2) \\ 3 \cdot u^2 \cdot (u-1) \cdot Rw_2 \cdot \sin(\Psi w_2 + \Delta \Psi w_2) \cdot \\ \sin(\gamma w_2 + \Delta \gamma w_2) \\ -3 \cdot u^2 \cdot (u-1) \cdot Rw_2 \cdot \cos(\gamma w_2 + \Delta \gamma w_2) \end{bmatrix} \cdot \left(\frac{d}{dt}\gamma_2\right)$$

and substituting for the speed along the path results in $$\frac{d}{dt}B = \begin{bmatrix} -6 \cdot u \cdot (-X_1 + X_2) \cdot (u-1) \ldots + \\ [3 \cdot \cos(\Psi w_1 + \Delta \Psi w_1) \cdot \\ \cos w(\gamma w_1 + \Delta \gamma w_1) \cdot (3 \cdot u - 1) \cdot (u-1)] \cdot Rw_1 \ldots + \\ [-3 \cdot u \cdot \cos(\Psi w_2 + \Delta \Psi w_2) \cdot \\ \cos(\gamma w_2 + \Delta \gamma w_2) \cdot (3 \cdot u - 2)] \cdot Rw_2 - \\ 6 \cdot u \cdot (u-1) \cdot (-Y_1 + Y_2) \ldots + \\ [3 \cdot \sin(\Psi w_1 + \Delta \Psi w_1) \cdot \\ \cos(\gamma w_1 + \Delta \gamma w_1) \cdot (3 \cdot u - 1) \cdot (u-1)] \cdot Rw_1 \ldots + \\ [-3 \cdot u \cdot \sin(\Psi w_2 + \Delta \Psi w_2) \cdot \\ \cos(\gamma w_2 + \Delta \gamma w_2) \cdot (3 \cdot u - 2)] \cdot Rw_2 - \\ 6 \cdot u \cdot (-Z_1 + Z_2) \cdot (u-1) \ldots \\ +[3 \cdot \sin(\gamma w_1 + \Delta \gamma w_1) \cdot (3 \cdot u - 1) \cdot (u-1)] \cdot Rw_1 \ldots + \\ [-3 \cdot u \cdot \sin(\gamma w_2 + \Delta \gamma w_2) \cdot (3 \cdot u - 2)] \cdot Rw_2 \end{bmatrix} \cdot$$

$$\left(\frac{d}{dt}u\right) \ldots +$$

$$(2 \cdot u + 1) \cdot (u-1)^2 \cdot \begin{bmatrix} Vx_1 \\ Vy_1 \\ Vz_1 \end{bmatrix} + -u^2 \cdot (-3 + 2 \cdot u) \cdot \begin{bmatrix} Vx_2 \\ Vy_2 \\ Vz_2 \end{bmatrix} \ldots +$$

$$\begin{bmatrix} -3 \cdot u \cdot (u-1)^2 \cdot Rw_1 \cdot \sin(\Psi w_1 + \Delta \Psi w_1) \cdot \\ \cos(\gamma w_1 + \Delta \gamma w_1) \\ 3 \cdot u \cdot (u-1)^2 \cdot Rw_1 \cdot \cos(\Psi w_1 + \Delta \Psi w_1) \cdot \\ \cos(\gamma w_1 + \Delta \gamma w_1) \\ 0 \end{bmatrix} \cdot \left(\frac{d}{dt}\Psi_1\right) \ldots +$$

$$\begin{bmatrix} 3 \cdot u^2 \cdot (u-1) \cdot Rw_2 \cdot \sin(\Psi w_2 + \Delta \Psi w_2) \cdot \\ \cos(\gamma w_2 + \Delta \gamma w_2) \\ -3 \cdot u^2 \cdot (u-1) \cdot Rw_2 \cdot \cos(\Psi w_2 + \Delta \Psi w_2) \cdot \\ \cos(\gamma w_2 + \Delta \gamma w_2) \\ 0 \end{bmatrix} \cdot \left(\frac{d}{dt}\Psi_2\right) \ldots +$$

$$\begin{bmatrix} -3 \cdot u \cdot (u-1)^2 \cdot Rw_1 \cdot \cos(\Psi w_1 + \Delta \Psi w_1) \cdot \\ \sin(\gamma w_1 + \Delta \gamma w_1) \\ -3 \cdot u \cdot (u-1)^2 \cdot Rw_1 \cdot \sin(\Psi w_1 + \Delta \Psi w_1) \cdot \\ \sin(\gamma w_1 + \Delta \gamma w_1) \\ 3 \cdot u \cdot (u-1)^2 \cdot Rw_1 \cdot \cos(\gamma w_1 + \Delta \gamma w_1) \end{bmatrix} \cdot \left(\frac{d}{dt}\gamma_1\right) \ldots +$$

$$\begin{bmatrix} 3 \cdot u^2 \cdot (u-1) \cdot Rw_2 \cdot \cos(\Psi w_2 + \Delta \Psi w_2) \cdot \\ \sin(\gamma w_2 + \Delta \gamma w_2) \\ 3 \cdot u^2 \cdot (u-1) \cdot Rw_2 \cdot \sin(\Psi w_2 + \Delta \Psi w_2) \cdot \\ \sin(\gamma w_2 + \Delta \gamma w_2) \\ -3 \cdot u^2 \cdot (u-1) \cdot Rw_2 \cdot \cos(\gamma w_2 + \Delta \gamma w_2) \end{bmatrix} \cdot \left(\frac{d}{dt}\gamma_2\right).$$

Solving for du/dt from $$\left(\frac{d}{du}B\right) \cdot \frac{d}{dt}u = V_i \cdot \begin{bmatrix} \cos(\Psi) \cdot \cos(\gamma) \\ \sin(\Psi) \cdot \cos(\gamma) \\ \sin(\gamma) \end{bmatrix} \ldots +$$

-continued $$-\begin{bmatrix} \left(\frac{d}{dP_1}B\right)\cdot\frac{d}{dt}P_1 + \left(\frac{d}{dP_2}B\right)\cdot\frac{d}{dt}P_2\ldots + \\ \left(\frac{d}{d\Psi_1}B\right)\cdot\left(\frac{d}{dt}\Psi_1\right) + \left(\frac{d}{d\Psi_2}B\right)\frac{d}{dt}\Psi_2\ldots + \\ \left(\frac{d}{d\gamma_1}b\right)\cdot\left(\frac{d}{dt}\gamma_1\right) + \left(\frac{d}{d\gamma_2}B\right)\cdot\frac{d}{dt}\gamma_2 \end{bmatrix} \text{ results in}$$

$$\frac{d}{dt}u = \frac{\left|V_i\cdot\begin{bmatrix}\cos(\Psi)\cdot\cos(\gamma)\\\sin(\Psi)\cdot\cos(\Psi)\\\sin(\gamma)\end{bmatrix}\ldots + \\ -\begin{bmatrix}\left(\frac{d}{dP_1}B\right)\frac{d}{dt}P_1 + \left(\frac{d}{dP_2}B\right)\frac{d}{dt}P_2\ldots + \\ \left(\frac{d}{d\Psi_1}B\right)\cdot\left(\frac{d}{dt}\Psi_1\right) + \left(\frac{d}{d\Psi_2}B\right)\cdot\frac{d}{dt}\Psi_2\ldots + \\ \left(\frac{d}{d\gamma_1}B\right)\cdot\left(\frac{d}{dt}\gamma_1\right) + \left(\frac{d}{d\gamma_2}B\right)\cdot\frac{d}{dt}\gamma_2 \end{bmatrix}\right|}{\left|\left(\frac{d}{du}B\right)\right|}.$$

Thus, a final expression for progress along a moving path may be represented by $$\frac{d}{dt}u = \frac{\sqrt{\begin{bmatrix}\cos(\Psi)\cdot\cos(\gamma)\cdot V_i - Vx_1\cdot(2\cdot u+1)\cdot(u-1)^2 + Vx_2\cdot u^2\cdot(-3+2\cdot u)\ldots + \\ 3\cdot u\cdot(u-1)^2\cdot\begin{bmatrix}\cos(\Psi w_1+\Delta\Psi w_1)\cdot\sin(\gamma w_1+\Delta\gamma w_1)\cdot\left(\frac{d}{dt}\gamma_1\right)\ldots + \\ \sin(\Psi w_1+\Delta\Psi w_1)\cdot\cos(\gamma w_1+\Delta\gamma w_1)\cdot\left(\frac{d}{dt}\Psi_1\right)\end{bmatrix}\cdot Rw_1\ldots + \\ \begin{bmatrix}-3\cdot u^2\cdot\begin{bmatrix}\sin(\Psi w_2+\Delta\Psi w_2)\cdot\cos(\gamma w_2+\Delta\gamma w_2)\cdot\left(\frac{d}{dt}\Psi_2\right)\ldots + \\ \cos(\Psi w_2+\Delta\Psi w_2)\cdot\sin(\gamma w_2+\Delta\gamma w_2)\cdot\left(\frac{d}{dt}\gamma_2\right)\end{bmatrix}\cdot(u-1)\cdot Rw_2 + \end{bmatrix}\end{bmatrix}^2 \ldots \\ \begin{bmatrix}\sin(\Psi)\cdot\cos(\gamma)\cdot V_1 + -Vy_1\cdot(2\cdot u+)\cdot(u-1)^2 + Vy_2\cdot u^2\cdot(-3+2\cdot u)\ldots + \\ 3\cdot u\cdot(u-1)^2\cdot\begin{bmatrix}\sin(\Psi w_1+\Delta\Psi w_1)\cdot\sin(\gamma w_1+\Delta\gamma w_1)\cdot\left(\frac{d}{dt}\gamma_1\right)\ldots + \\ -\cos(\Psi w_1+\Delta\Psi w_1)\cdot\cos(\gamma w_1+\Delta\gamma w_1)\cdot\left(\frac{d}{dt}\Psi_1\right)\end{bmatrix}\cdot Rw_1\ldots + \\ \begin{bmatrix}3\cdot u^2\cdot\begin{bmatrix}\cos(\Psi w_2+\Delta\Psi w_2)\cdot\cos(\gamma w_2+\Delta\gamma w_2)\cdot\left(\frac{d}{dt}\Psi_2\right)\ldots + \\ -\sin(\Psi w_2+\Delta\Psi w_2)\cdot\sin(\gamma w_2+\Delta\gamma w_2)\cdot\left(\frac{d}{dt}\gamma_2\right)\end{bmatrix}\cdot(u-1)\cdot Rw_2 + \end{bmatrix}\end{bmatrix}^2 \ldots \\ \begin{bmatrix}\sin(\gamma)\cdot V_T - Vz_1\cdot(2\cdot u+1)\cdot(u-1)^2 + Vz_2\cdot u^2\cdot(-3+2\cdot u)\ldots + \\ -3\cdot u\cdot(u-1)^2\cdot Rw_1\cdot\cos(\gamma w_1+\Delta\gamma w_1)\cdot\left(\frac{d}{dt}\gamma_1\right)\ldots + \\ 3\cdot u^2\cdot(u-1)\cdot Rw_2\cdot\cos(\gamma w_2+\Delta\gamma w_2)\cdot\left(\frac{d}{dt}\gamma_2\right)\end{bmatrix}^2}}{\sqrt{\begin{bmatrix}-6\cdot u\cdot(-X_1+X_2)\cdot(u-1)\ldots + \\ 3\cdot\cos(\Psi w_1+\Delta\Psi w_1)\cdot\cos(\gamma w_1+\Delta\gamma w_1)\cdot(3\cdot u-1)\cdot(u-1)\cdot Rw_1\ldots + \\ -3\cdot u\cdot\cos(\Psi w_2+\Delta\Psi w_2)\cdot\cos(\gamma w_2+\Delta\gamma w_2)\cdot(3\cdot u-2)\cdot Rw_2\end{bmatrix}^2 \ldots + \\ \begin{bmatrix}-6\cdot u\cdot(u-1)\cdot(-Y_1+Y_2)\ldots + \\ 3\cdot\sin(\Psi w_1+\Delta\Psi w_1)\cdot\cos(\gamma w_1+\Delta\gamma w_1)\cdot(3\cdot u-1)\cdot(u-1)\cdot Rw_1\ldots + \\ -3\cdot u\cdot\sin(\Psi w_2+\Delta\Psi w_2)\cdot\cos(\gamma w_2+\Delta\gamma w_2)\cdot(3\cdot u-2)\cdot Rw_2\end{bmatrix}^2 \ldots + \\ \begin{bmatrix}-6\cdot u\cdot(-Z_1+Z_2)\cdot(u-1)\ldots + \\ 3\cdot\sin(\gamma w_1+\Delta\gamma w_1)\cdot(3\cdot u-1)\cdot(u-1)\cdot Rw_1\ldots + \\ -3\cdot u\cdot\sin(\gamma w_2+\Delta\gamma w_2)\cdot(3\cdot u-2)\cdot Rw_2\end{bmatrix}^2}}.$$

This pair of differential equations may be used to track the vehicles progress along the path. The instantaneous arc length between waypoints may be represented by $$S = \int_0^1 \sqrt{\begin{bmatrix} \begin{array}{l} -6 \cdot u \cdot (-X_1 + X_2) \cdot (u-1) \ldots + \\ [3 \cdot \cos(\Psi w_1 + \Delta\Psi w_1) \cdot \cos(\gamma w_1 + \Delta\gamma w_1) \cdot (3 \cdot u - 1) \cdot (u-1)] \cdot Rw_1 \ldots + \\ [-3 \cdot u \cdot \cos(\Psi w_2 + \Delta\Psi w_2) \cdot \cos(\gamma w_2 + \Delta\gamma w_2) \cdot (3 \cdot u - 2)] \cdot Rw_2 \end{array} \end{bmatrix}^2 \\ + \begin{bmatrix} \begin{array}{l} -6 \cdot u \cdot (u-1) \cdot (-Y_1 + Y_2) \ldots + \\ [3 \cdot \sin(\Psi w_1 + \Delta\Psi w_1) \cdot \cos(\gamma w_1 + \Delta\gamma w_1) \cdot (3 \cdot u - 1) \cdot (u-1)] \cdot Rw_1 \ldots + \\ [-3 \cdot u \cdot \sin(\Psi w_2 + \Delta\Psi w_2) \cdot \cos(\gamma w_2 + \Delta\gamma w_2) \cdot (3 \cdot u - 2)] \cdot Rw_2 \end{array} \end{bmatrix}^2 \\ + \begin{bmatrix} \begin{array}{l} -6 \cdot u \cdot (-Z1 + Z2) \cdot (u-1) \ldots + \\ [3 \cdot \sin(\gamma w1 + \Delta\gamma w1) \cdot (3 \cdot u - 1) \cdot (u-1)] \cdot Rw_1 \ldots + \\ [-3 \cdot u \cdot \sin(\gamma w_2 + \Delta\gamma w_2) \cdot (3 \cdot u - 2)] \cdot Rw_2 \end{array} \end{bmatrix}^2} \, du +\ldots$$

For moving waypoints, the actual distance travelled depends on the velocity of the vehicle because the vehicle must catch the moving waypoint. As such, the actual distance traveled may be solved by integrating dS/dt and du/dt until u=1. Representative equations for dS/dt are $$\frac{d}{dt}S = \left|\frac{d}{du}B\right|\frac{d}{dt}u,$$

$$\frac{d}{dt}S = \left| \begin{array}{l} V_i \cdot \begin{bmatrix} \cos(\Psi)\cdot\cos(\gamma) \\ \sin(\Psi)\cdot\cos(\gamma) \\ \sin(\gamma) \end{bmatrix} \ldots + \\ \begin{bmatrix} \left(\frac{d}{dP_1}B\right)\cdot\frac{d}{dt}P_1 + \left(\frac{d}{dP_2}B\right)\frac{d}{dt}P_2\ldots + \\ \left(\frac{d}{d\Psi_1}B\right)\cdot\left(\frac{d}{dt}\Psi_1\right) + \left(\frac{d}{d\Psi_2}B\right)\cdot\frac{d}{dt}\Psi_2\ldots + \\ \left(\frac{d}{d\gamma_1}B\right)\cdot\left(\frac{d}{dt}\gamma_1\right) + \left(\frac{d}{d\gamma_2}B\right)\cdot\frac{d}{dt}\gamma_2 \end{bmatrix} \end{array} \right|, \text{ and}$$

$$\frac{d}{dt}S = \sqrt{\begin{bmatrix} \cos(\Psi)\cdot\cos(\gamma)\cdot V_i - Vx_1\cdot(2\cdot u+1)\cdot(u-1)^2 + Vx_2\cdot u^2\cdot(-3+2\cdot u)\ldots + \\ 3\cdot u\cdot(u-1)^2 \cdot \begin{bmatrix} \cos(\Psi w_1 + \Delta\Psi w_1)\cdot\sin(\gamma w_1 + \Delta\gamma w_1)\cdot\left(\frac{d}{dt}\gamma_1\right)\ldots + \\ \sin(\Psi w_1 + \Delta\Psi w_1)\cdot\cos(\gamma w_1 + \Delta\gamma w_1)\cdot\left(\frac{d}{dt}\Psi_1\right) \end{bmatrix}\cdot Rw_1\ldots + \\ \begin{bmatrix} -3\cdot u^2 \cdot \begin{bmatrix} \sin(\Psi w_2 + \Delta\Psi w_2)\cdot\cos(\gamma w_2 + \Delta\gamma w_2)\cdot\left(\frac{d}{dt}\Psi_2\right)\ldots + \\ \cos(\Psi w_2 + \Delta\Psi w_2)\cdot\sin(\gamma w_2 + \Delta\gamma w_2)\cdot\left(\frac{d}{dt}\gamma_2\right) \end{bmatrix}\cdot(u-1)\cdot Rw_2 + \end{bmatrix} \end{bmatrix}^2 \\ + \begin{bmatrix} [\sin(\Psi)\cdot\cos(\gamma)\cdot V_i + -Vy_1\cdot(2\cdot u+1)\cdot(u-1)^2] + Vy_2\cdot u^2\cdot(-3+2\cdot u)\ldots + \\ 3\cdot u\cdot(u-1)^2 \cdot \begin{bmatrix} \sin(\Psi w_1 + \Delta\Psi w_1)\cdot\sin(\gamma w_1 + \Delta\gamma w_1)\cdot\left(\frac{d}{dt}\gamma_1\right)\ldots + \\ -\cos(\Psi w_1 + \Delta\Psi w_1)\cdot\cos(\gamma w_1 + \Delta\gamma w_1)\cdot\left(\frac{d}{dt}\Psi_1\right) \end{bmatrix}\cdot Rw_1\ldots + \\ \begin{bmatrix} 3\cdot u^2 \cdot \begin{bmatrix} \cos(\Psi w_2 + \Delta\Psi w_2)\cdot\cos(\gamma w_2 + \Delta\gamma w_2)\cdot\left(\frac{d}{dt}\Psi_2\right)\ldots + \\ -\sin(\Psi w_2 + \Delta\Psi w_2)\cdot\sin(\gamma w_2 + \Delta\gamma w_2)\cdot\left(\frac{d}{dt}\gamma_2\right) \end{bmatrix}\cdot(u-1)\cdot Rw_2 + \end{bmatrix} \end{bmatrix}^2 \\ + \begin{bmatrix} \sin(\gamma)\cdot V_T - Vz_1\cdot(2\cdot u+1)\cdot(u-1)^2 + Vz_2\cdot u^2\cdot(-3+2\cdot u)\ldots + \\ -3\cdot u\cdot(u-1)^2\cdot Rw_1\cdot\cos(\gamma w_1 + \Delta\gamma w_1)\cdot\left(\frac{d}{dt}\gamma_1\right)\ldots + \\ 3\cdot u^2\cdot(u-1)\cdot Rw_2\cdot\cos(\gamma w_2 + \Delta\gamma w_2)\cdot\left(\frac{d}{dt}\gamma_2\right) \end{bmatrix}^2}$$

Once the speed along the path is determined as above, the differential equation for u can be found from $$\frac{d}{dt}u = \frac{\frac{d}{dt}S}{\sqrt{\begin{bmatrix} -6 \cdot u \cdot (-X_1 + X_2) \cdot (u-1) \ldots + \\ 3 \cdot \cos(\Psi w_1 + \Delta\Psi w_1) \cdot \cos(\gamma w_1 + \Delta\gamma w_1) \cdot (3 \cdot u - 1) \cdot (u-1) \cdot Rw_1 \ldots + \\ -3 \cdot u \cdot \cos(\Psi w_2 + \Delta\Psi w_2) \cdot \cos(\gamma w_2 + \Delta\gamma w_2) \cdot (3 \cdot u - 2) \cdot Rw_2 \end{bmatrix}^2 \ldots + \begin{bmatrix} -6 \cdot u \cdot (u-1)`9(-Y_1 + Y_2) \ldots + \\ 3 \cdot \sin(\Psi w_1 + \Delta\Psi w_1) \cdot \cos(\gamma w_1 + \Delta\gamma w_1) \cdot (3 \cdot u - 1) \cdot (u-1) \cdot Rw_1 \ldots + \\ -3 \cdot u \cdot \sin(\Psi w_2 + \Delta\Psi w_2) \cdot \cos(\gamma w_2 + \Delta\gamma w_2) \cdot (3 \cdot u - 2) \cdot Rw_2 \end{bmatrix}^2 \ldots + \begin{bmatrix} -6 \cdot u \cdot (-Z_1 + Z_2) \cdot (u-1) \ldots + \\ 3 \cdot \sin(\gamma w_1 + \Delta\gamma w_1) \cdot (3 \cdot u - 1) \cdot (u-1) \cdot Rw_1 \ldots + \\ -3 \cdot u \cdot \sin(\gamma w_2 + \Delta\gamma w_2) \cdot (3 \cdot u - 2) \cdot Rw_2 \end{bmatrix}^2}}.$$

This may be used as a predictor, and the same quintic as for the fixed waypoint position is used as a corrector to get the new value of u.

As for the fixed waypoint guidance routine, a vehicle may be disturbed from the ideal path, requiring crosstrack regulation and associated waypoint sequencing. However, for moving waypoints the leading or target point is the point at which both the vehicle and the path will be at the future time, rather than the present time. This generates an additional lead necessary to account for the motion of the waypoints. The corrected course is aimed at the leading or target point. This can be done in at least two ways, including explicit integration of dB/dt over the lead time $\Delta t$ with all values based on the current time, and by integrating du/dt to get $\Delta u$ and calculating the position on the instantaneous path at the future time. The former approach uses the expression for dB/dt presented above. The latter approach is developed below. As before, waypoint sequencing occurs when $u+\Delta u>1$. Accordingly, $$\Delta u = \frac{d}{dt}u \cdot \Delta t$$

and u'=u+$\Delta$u.

Waypoint positions may be either known explicitly as a function of time or the waypoint positions must be determined dynamically by integrating the waypoint velocities, linear and angular. Likely, the moving waypoint state information may be transmitted continuously to the vehicle from a data source such as via wireless transmission from a base station or a moving target vehicle, so although the curved waypoint guidance is entirely deterministic, the guidance may be considered to be a form of adaptive mission planning. Waypoint velocity may be assumed constant over the interval $\Delta t$ for the purposes of determining the leading or target point. Accordintly, the curved flightpath guidance using moving waypoints of one embodiment of of the present invention is fully deterministic and adapts to both moving and fixed targets.

The commanded position is the position along the path, as it will exist at the future time, represented by $P_c=B(u+\Delta u, t+\Delta t)$ and $$P_c = \begin{bmatrix} (2\cdot(u+\Delta u)+1)\cdot(u+\Delta u-1)^2 \cdot \left[X_1 + \left(\frac{d}{dt}X_1\right)\cdot \Delta t\right]\ldots + \\ 3\cdot(u+\Delta u)\cdot(u+\Delta u-1)^2 \cdot Rw_1 \cdot \cos\begin{bmatrix}\Psi w_1+\Delta\Psi w_1\ldots \\ +\left(\frac{d}{dt}\Psi_1\right)\cdot \Delta t\end{bmatrix}\cdot \cos\begin{bmatrix}\gamma w_1+\Delta\gamma w_1\ldots + \\ +\left(\frac{d}{dt}\gamma_1\right)\cdot \Delta t\end{bmatrix}\ldots + \\ -(u+\Delta u)^2\cdot(-3+2\cdot(u+\Delta u))\cdot\left[X_2+\left(\frac{d}{dt}X_2\right)\cdot \Delta t\right]\ldots + \\ -3\cdot u^2\cdot(u+\Delta u-1)\cdot Rw_2 \cdot \cos\begin{bmatrix}\Psi w_2+\Delta\Psi w_2\ldots + \\ \left(\frac{d}{dt}\Psi_2\right)\cdot \Delta t\end{bmatrix}\cdot \cos\begin{bmatrix}\gamma w_2+\Delta\gamma w_2\ldots + \\ \left(\frac{d}{dt}\gamma_2\right)\cdot \Delta t\end{bmatrix} \\ (2\cdot(u+\Delta u)+1)\cdot(u+\Delta u-1)^2 \cdot \left[Y_1+\left(\frac{d}{dt}Y_1\right)\cdot \Delta t\right]\ldots + \\ 3\cdot(u+\Delta u)\cdot(u+\Delta u-1)^2 \cdot Rw_1 \cdot \sin\begin{bmatrix}\Psi w_1+\Delta\Psi w_1\ldots + \\ \left(\frac{d}{dt}\Psi_1\right)\cdot \Delta t\end{bmatrix}\cdot \cos\begin{bmatrix}\gamma w_1+\Delta\gamma w_1\ldots + \\ \left(\frac{d}{dt}\gamma_1\right)\cdot \Delta t\end{bmatrix}\ldots + \\ -(u+\Delta u)^2\cdot(-3+2\cdot(u+\Delta u))\cdot\left[Y_2+\left(\frac{d}{dt}Y_2\right)\cdot \Delta t\right]\ldots + \\ -3\cdot(u+\Delta u)^2\cdot(u+\Delta u-1)\cdot Rw_2 \cdot \sin\begin{bmatrix}\Psi w_2+\Delta\Psi w_2\ldots + \\ \left(\frac{d}{dt}\Psi_2\right)\cdot \Delta t\end{bmatrix}\cdot \cos\begin{bmatrix}\gamma w_2+\Delta\gamma w_2\ldots + \\ \left(\frac{d}{dt}\gamma_2\right)\cdot \Delta t\end{bmatrix} \\ (2\cdot(u+\Delta u)+1)\cdot(u+\Delta u-1)^2 \cdot \left[Z_1+\left(\frac{d}{dt}Z_1\right)\cdot \Delta t\right]\ldots + \\ 3\cdot(u+\Delta u)\cdot(u+\Delta u-1)^2\cdot Rw_1 \cdot \sin\left[\gamma w_1+\Delta\gamma w_1 + \left(\frac{d}{dt}\gamma_1\right)\cdot \Delta t\right]\ldots + \\ -(u+\Delta u)^2\cdot(-3+2\cdot(u+\Delta u))\cdot\left[Z_2+\left(\frac{d}{dt}Z_2\right)\cdot \Delta t\right]\ldots + \\ 3\cdot(u+\Delta u)^2\cdot(u+\Delta u-1)\cdot Rw_2 \cdot \sin\left[\gamma w_2+\Delta\gamma w_2 + \left(\frac{d}{dt}\gamma_2\right)\cdot \Delta t\right] \end{bmatrix}.$$

35

The commanded course in the horizontal plane from the current position to intercept the desired path may be represented by The commanded angle in the vertical plane, the glidepath angle, to correct back to the path may be represented by $$\tan(\Psi_c) = \frac{\begin{bmatrix}(2\cdot(u+\Delta u)+1)\cdot(u+\Delta u-1)^2\cdot\left[Y_1+\left(\frac{d}{dt}Y_1\right)\cdot \Delta t\right]\ldots + \\ 3\cdot(u+\Delta u)\cdot(u+\Delta u-1)^2 \cdot Rw_1 \cdot \sin\begin{bmatrix}\Psi w_1+\Delta\Psi w_1\ldots + \\ \left(\frac{d}{dt}\Psi_1\right)\cdot \Delta t\end{bmatrix}\cdot\cos\begin{bmatrix}\gamma w_1+\Delta\gamma w_1\ldots + \\ \left(\frac{d}{dt}\gamma_1\right)\cdot \Delta t\end{bmatrix}\ldots + \\ -(u+\Delta u)^2\cdot(-3+2\cdot(u+\Delta u))\cdot\left[Y_2+\left(\frac{d}{dt}Y_2\right)\cdot \Delta t\right]\ldots + \\ -3\cdot(u+\Delta u)^2\cdot(u+\Delta u-1)\cdot Rw_2 \cdot \sin\begin{bmatrix}\Psi w_2+\Delta\Psi w_2\ldots + \\ \left(\frac{d}{dt}\Psi_2\right)\cdot \Delta t\end{bmatrix}\cdot\cos\begin{bmatrix}\gamma w_2+\Delta\gamma w_2\ldots + \\ \left(\frac{d}{dt}\gamma_2\right)\cdot \Delta t\end{bmatrix}\ldots + \\ -Y\end{bmatrix}}{\begin{bmatrix}(2\cdot(u+\Delta u)+1)\cdot(u+\Delta u-1)^2\cdot\left[X_1+\left(\frac{d}{dt}X_1\right)\cdot \Delta t\right]\ldots + \\ 3\cdot(u+\Delta u)\cdot(u+\Delta u-1)^2 \cdot Rw_1 \cdot \cos\begin{bmatrix}\Psi w_1+\Delta\Psi w_1\ldots + \\ \left(\frac{d}{dt}\Psi_1\right)\cdot \Delta t\end{bmatrix}\cdot\cos\begin{bmatrix}\gamma w_1+\Delta\gamma w_1\ldots + \\ \left(\frac{d}{dt}\gamma_1\right)\cdot \Delta t\end{bmatrix}\ldots + \\ -(u+\Delta u)^2\cdot(-3+2\cdot(u+\Delta u))\cdot\left[X_2+\left(\frac{d}{dt}X_2\right)\cdot \Delta t\right]\ldots + \\ -3\cdot(u+\Delta u)^2\cdot(u+\Delta u-1)\cdot Rw_2\cdot\cos\begin{bmatrix}\Psi w_2+\Delta\Psi w_2\ldots + \\ \left(\frac{d}{dt}\Psi_2\right)\cdot \Delta t\end{bmatrix}\cdot\cos\begin{bmatrix}\gamma w_2+\Delta\gamma w_2\ldots + \\ \left(\frac{d}{dt}\gamma_2\right)\cdot \Delta t\end{bmatrix}\ldots + \\ -X\end{bmatrix}}.$$

$$\tan(\gamma_c) = \frac{\begin{bmatrix} (2 \cdot (u + u\Delta u) + 1) \cdot (u + \Delta u - 1)^2 \cdot \left[Z_1 + \left(\frac{d}{dt}Z_1\right) \cdot \Delta t\right] \ldots + \\ 3 \cdot (u + \Delta u) \cdot (u + \Delta u - 1)^2 \cdot Rw_1 \cdot \sin\left[\gamma w_1 + \Delta \gamma w_1 + \left(\frac{d}{dt}\gamma_1\right) \cdot \Delta t\right] \ldots + \\ -(u + \Delta u)^2 \cdot (-3 + 2 \cdot (u + \Delta u)) \cdot \left[Z_2 + \left(\frac{d}{dt}Z_2\right) \cdot \Delta t\right] \ldots + \\ -3 \cdot (u + \Delta u)^2 \cdot (u + \Delta u - 1) \cdot Rw_2 \cdot \sin\left[\gamma w_2 + \Delta \gamma w_2 + \left(\frac{d}{dt}\gamma_2\right) \cdot \Delta t\right] \ldots \\ +-Z \end{bmatrix}}{\sqrt{\begin{bmatrix} (2 \cdot (u + \Delta u) + 1) \cdot (u + \Delta u - 1)^2 \cdot \left[X_1 + \left(\frac{d}{dt}X_1\right) \cdot \Delta t\right] \ldots + \\ 3 \cdot (u + \Delta u) \cdot (u + \Delta u - 1)^2 \cdot Rw_1 \cdot \cos\begin{bmatrix} \Psi w_1 + \Delta \Psi w_1 \ldots + \\ \left(\frac{d}{dt}\Psi_1\right) \cdot \Delta t \end{bmatrix} \cdot \cos\begin{bmatrix} \gamma w_1 + \Delta \gamma w_1 \ldots + \\ \left(\frac{d}{dt}\gamma_1\right) \cdot \Delta t \end{bmatrix} \ldots + \\ -(u + \Delta u)^2 \cdot (-3 + 2 \cdot (u + \Delta u)) \cdot \left[X_2 + \left(\frac{d}{dt}X_2\right) \cdot \Delta t\right] \ldots + \\ -3 \cdot u^2 \cdot (u + \Delta u - 1) \cdot Rw_2 \cdot \cos\begin{bmatrix} \Psi w_2 + \Delta \Psi w_2 \ldots + \\ \left(\frac{d}{dt}\Psi_2\right) \cdot \Delta t \end{bmatrix} \cdot \cos\begin{bmatrix} \gamma w_2 + \Delta \gamma w_2 \ldots + \\ \left(\frac{d}{dt}\gamma_2\right) \cdot \Delta t \end{bmatrix} \ldots \\ +-X \end{bmatrix}^2 + \begin{bmatrix} (2 \cdot (u + \Delta u) + 1) \cdot (u + \Delta u - 1)^2 \cdot \left[Y_1 + \left(\frac{d}{dt}Y_1\right) \cdot \Delta t\right] \ldots + \\ 3 \cdot (u + \Delta u) \cdot (u + \Delta u - 1)^2 \cdot Rw_1 \cdot \sin\begin{bmatrix} \Psi w_1 + \Delta \Psi w_1 \ldots + \\ \left(\frac{d}{dt}\Psi_1\right) \cdot \Delta t \end{bmatrix} \cdot \cos\begin{bmatrix} \gamma w_1 + \Delta \gamma w_1 \ldots + \\ \left(\frac{d}{dt}\gamma_1\right) \cdot \Delta t \end{bmatrix} \ldots + \\ -(u + \Delta u)^2 \cdot (-3 + 2 \cdot (u + \Delta u)) \cdot \left[Y_2 + \left(\frac{d}{dt}Y_2\right) \cdot \Delta t\right] \ldots + \\ -3 \cdot (u + \Delta u)^2 \cdot (u + \Delta u - 1) \cdot Rw_2 \cdot \sin\begin{bmatrix} \Psi w_2 + \Delta \Psi w_2 \ldots + \\ \left(\frac{d}{dt}\Psi_2\right) \cdot \Delta t \end{bmatrix} \cdot \cos\begin{bmatrix} \gamma w_2 + \Delta \gamma w_2 \ldots + \\ \left(\frac{d}{dt}\gamma_2\right) \cdot \Delta t \end{bmatrix} \ldots + \\ -Y \end{bmatrix}^2}}$$

The system and method of the present invention for guidance along a path defined by waypoints incorporates waypoints that may be moving or fixed in space and guidance commands to adhere to the intended route. Computing guidance commands such as for lateral acceleration based on line of sight angle and line of sight rate to the waypoint is an entirely different guidance solution than correcting back to the path in accordance with the present invention. Similarly, aiming to fly to or over the subsequent waypoint is an entirely different guidance solution with no control over the approach to or departure from waypoints and no control over what happens in between waypoints. By simply aiming at the waypoint, the crosstrack gain increases with increasing proximity to the waypoint. By comparison, in the present invention, the guidance for a vehicle is always aiming at a point a constant distance ahead on the path. So the effective crosstrack gain stays constant and doesn't rise as the waypoint is approached. This also provides a higher gain for better tracking when far from the waypoint. And if the crosstrack error is really large, the present invention guidance scheme will bring the aircraft back to the path at near a right angle to the path, then smoothly turn to follow the path as the aircraft gets back to the path.

Similarly, by employing moving waypoints, in addition to or as an alternative to fixed waypoints, a guidance routine, such as the embodiment described using Bezier curves, is capable of accommodating additional applications and is capable of returning improved guidance results.

One of ordinary skill in the art will recognize that guidance systems accommodating moving waypoints may be derived using methods other than Bezier curves. The example provided herein is merely one embodiment of the present invention for providing guidance along a path using fixed and/or moving waypoints. Similarly, the example embodiment, and other guidance solutions, may be represented and solved using different variables and parameters.

One of ordinary skill in the art will also recognize that the present invention may be incorporated into software systems and subsystems such as flight control computers, navigation systems, and mission planning systems, as well as various other guidance and navigation applications. In each of these systems as well as other systems, including dedicated systems, capable of hosting the system and method of the present invention as described above, the system generally can include a computer system including one or more processors that are capable of operating under software control to provide the guidance techniques described above. Modem processors are more than capable of implementing the algorithm in real time.

Figure 3:
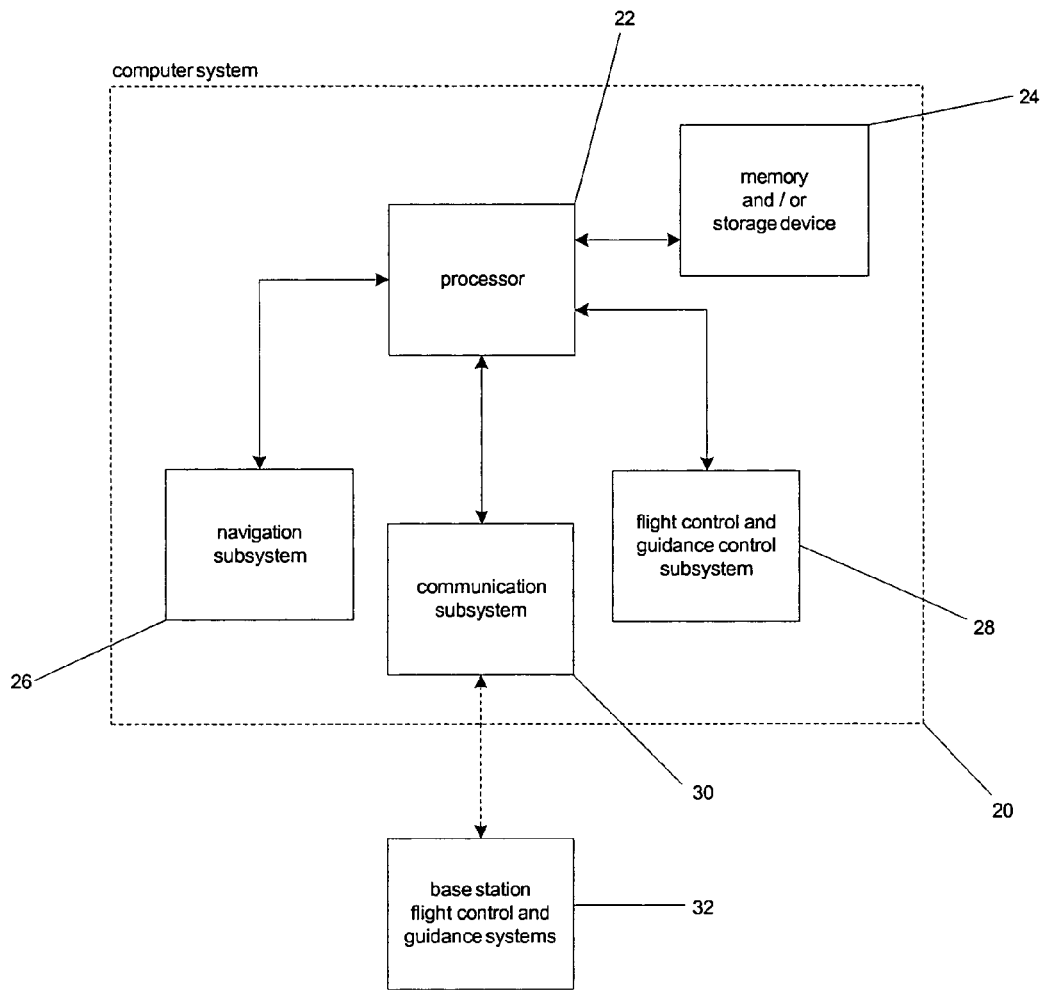
FIG. 3 is a block diagram of one embodiment of a guidance system of the present invention.

FIG. 3 is a block diagram of one embodiment of a guidance system of the present invention. As shown in FIG. 3, an embodiment of a guidance system of the present invention may be embodied by a computer system 20. In this regard, such a computer system may include at least one processing element, such as a processor 22 or central processing unit, manipulating software and data stored by memory and/or a storage device 24. The processor may operate a navigation subsystem 26, a flight control and guidance subsystem 28, and a communication subsystem 30, or the processor 22 may communicate with independent processor(s) of the navigation subsystem 26, a flight control and guidance subsystem 28, and a communication subsystem 30. One or more processors, memory, storage devices, and other computer elements may be used in common by a computer system and subsystems, as part of the same platform, or processors may be distributed between a computer system and subsystems, as parts of multiple platforms. To acquire movement information about waypoints, the communication subsystem 30 may communicate with a base station flight control and guidance subsystem 32. Additionally or alternatively, a sensor may be used to observe movement of a waypoint, such as an automated tracking system using an optical camera and relative position software program, or a transceiver may be used to receive and/or transmit information relative to obtaining or determining the movement of a waypoint, such as using wireless communications with a control tower or a vehicle associated with a waypoint for relay of data regarding the movement of a waypoint.

Figure 4:
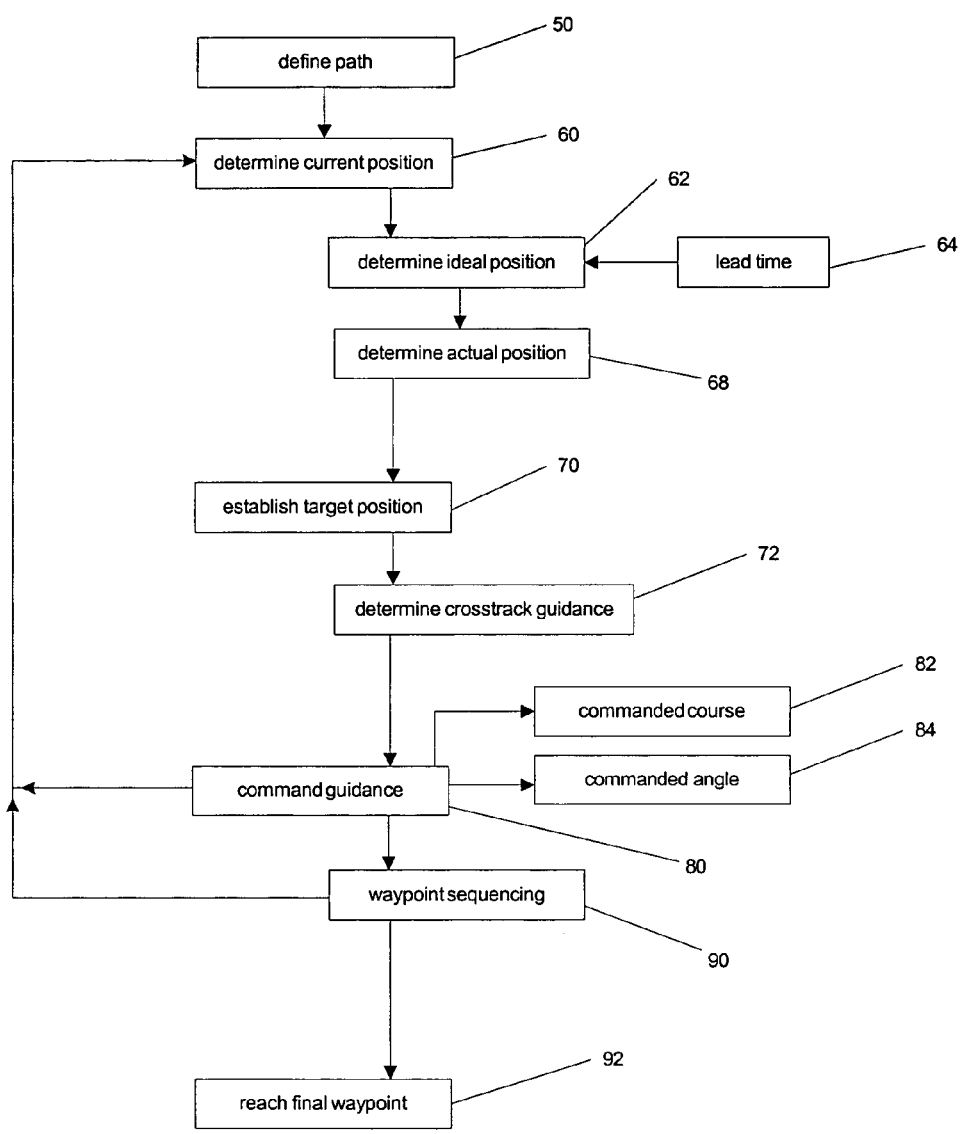
FIG. 4 is a block diagram of a flowchart of a guidance solution for a method of and guidance solution of embodiments of the present invention.

FIG. 4 is a block diagram of a flowchart of a guidance solution for a method of and guidance solution of embodiments of the present invention. This flowchart shows an example order and repeating loop for commanding guidance of a vehicle along a path defined by a series of fixed or moving waypoints. In order to guide the vehicle, an intended path is defined and a current position is determined. However, due to variance from intended guidance, the current position may be defined by an ideal position and the actual position of the vehicle. To guide the vehicle, a target position along the path provides the direction for crosstrack guidance. A commanded course and angle are used to direct the vehicle along the path. By repeating these steps, and sequencing waypoints as needed, a vehicle may be effectively and efficiently guided to or towards a destination waypoint.

Each block, or step, or element of the flowchart, and combinations of blocks and/or elements in the flowchart, support combinations of means and combinations of steps for performing the specified functions. Similarly, each block, or step, or element of the flowchart, and combinations of blocks and/or elements in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or element(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or element(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or element(s). Also, each block or element of the flowchart, and combinations of blocks and/or elements in the flowchart, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A guidance system, comprising:
   a processing element for defining:
   a path defined by a series of waypoints;
   a current position relative to the path; and
   a target position along the path,
   wherein the processing element generates a guidance command for directing a vehicle towards the target position, wherein the guidance command is capable of accounting for movement of at least one of the waypoints.

2. The system of claim 1, further comprising a waypoint movement sensor to observe movement of at least one waypoint.

3. The system of claim 1, further comprising a transceiver to receive data of movement of at least one waypoint.

4. The system of claim 1, wherein the processing element further defines an ideal position along the path, wherein the current position is perpendicular to a tangent to the path at the ideal position.

5. The system of claim 1, further comprising a guidance subsystem capable of updating the current position and target position.

6. The system of claim 1, further comprising a guidance subsystem capable of checking waypoint sequencing.

7. The system of claim 6, wherein the series of waypoints comprises:
   a previous waypoint P, a current waypoint C, and a next waypoint N, and
   wherein the processing element is capable of determining that the current waypoint C becomes a previous waypoint P' and the next waypoint becomes a current waypoint C'.

8. The system of claim 1, wherein the processing element defines the path between successive waypoints to be curved.

9. The system of claim 7, wherein at least one of the successive waypoints is moving.

10. The system of claim 7, wherein the successive waypoints are moving.

11. The system of claim 7, wherein the processing element defines the path by a Bezier curve.

12. A guidance system, comprising:
a processing element for defining:
a path defined by a series of waypoints, wherein at least one of the waypoints is moving, and wherein the path is defined by a Bezier curve;
a current position relative to the path; and
a target position along the path,
wherein the processing element generates a guidance command towards the target position, and wherein generating a guidance command comprises accounting for the movement of at least one of the waypoints.

13. The system of claim 12, wherein the path is defined by a function B(u) wherein u is an independent variable from 0 to 1.

14. The system of claim 13, wherein the processing element further defines an ideal position along the path, wherein the current position is at a radius vector perpendicular to a tangent to the path at the ideal position.

15. The system of claim 14, wherein the ideal position is defined by P(u) and the radius vector is defined by $r_u$.

16. The system of claim 15, wherein the processing element defines the target position by a lead time $\Delta t$.

17. The system of claim 15, wherein the processing element defines the current position by $$r_u^T \cdot \frac{d}{du} P(u) = 0.$$

18. The system of claim 17, wherein the processing element defines the target position by $P_c(u)$.

19. The system of claim 18, wherein the processing element defines the guidance command by a commanded course $\Psi_c$ and a commanded angle $\gamma_c$.

20. The system of claim 12, wherein at least two successive waypoints are moving.

21. A method of controlling a vehicle, comprising:
defining a path by a series of waypoints;
determining a current position of the vehicle relative to the path;
establishing a target position along the path; and
commanding guidance of the vehicle towards the target position, wherein the step of commanding guidance is capable of accounting for movement of at least one of the waypoints.

22. The method of claim 21, further comprising the step of:
determining an ideal position along the path, wherein the current position is perpendicular to a tangent to the path at the ideal position.

23. The method of claim 22, wherein the step of establishing a target position along the path comprises the step of:
determining a position forward along the path from the ideal position for a predetermined lead time.

24. The method of claim 21, further comprising the step of:
determining crosstrack guidance for guiding the vehicle from the current position to the target position along the path, wherein the current position is perpendicular to a tangent vector $\Delta Y_{xtk}$ to the path at the ideal position, and wherein the target position is defined by $V_u \Delta t$ ahead of the ideal position along the path.

25. The method of claim 21, wherein the step of commanding guidance of the vehicle comprises the steps of:
commanding a course of the vehicle towards the target position; and
commanding an angle of the vehicle towards the target position.

26. The method of claim 21, further comprising the step of:
repeating the steps of determining a current position, establishing a target position, and commanding guidance of the vehicle.

27. The method of claim 21, further comprising the step of:
checking waypoint sequencing.

28. The method of claim 27, further comprising the step of sequencing the series of waypoints, wherein the series of waypoints comprises a previous waypoint P, a current waypoint C, and a next waypoint N, and wherein the current waypoint C becomes a previous waypoint P' and the next waypoint becomes a current waypoint C'.

29. The method of claim 28, wherein the step of defining a path by a series of waypoints uses at least one moving waypoint.

30. The method of claim 28, wherein the step of defining a path by a series of waypoints uses at least two successive moving waypoints.

31. The method of claim 28, wherein the step of defining a path by a series of waypoints defines a Bezier curve path.

32. The method of claim 21, wherein the step of defining a path by a series of waypoints defines a curved path between successive waypoints.

33. A method of controlling a vehicle, comprising:
defining a path by a series of waypoints, wherein at least one of the waypoints is moving, and wherein the path is defined by a Bezier curve;
determining a current position of the vehicle relative to the path;
establishing a target position along the path; and
commanding guidance of the vehicle towards the target position, wherein commanding guidance comprises accounting for the movement of at least one of the waypoints.

34. The method of claim 33, wherein the path is defined by a function B(u) wherein u is an independent variable from 0 to 1.

35. The method of claim 34, further comprising the step of:
determining an ideal position along the path, wherein the current position is at a radius vector perpendicular to a tangent to the path at the ideal position.

36. The method of claim 35, wherein the step of determining an ideal position along the path uses a point on the curve P(u) and the radius vector $r_u$.

37. The method of claim 36, wherein the step of establishing a target position uses a lead time $\Delta t$.

38. The method of claim 36, wherein the step of determining a current position defines a current position by $$r_u^T \cdot \frac{d}{du} P(u) = 0.$$

39. The method of claim 38, wherein the step of establishing a target position defines a target position by $P_c(u)$.

40. The method of claim 39, wherein the step of commanding guidance defines a commanded course by $\Psi_c$ and a commanded angle by $\gamma_c$.

41. The method of claim 33, wherein the step of defining a path by a series of waypoints uses at least two successive moving waypoints.

42. The method of claim 33, further comprising the step of:

checking waypoint sequencing.

43. The method of claim 42, further comprising the step of sequencing the series of waypoints, wherein the series of waypoints comprises a previous waypoint P, a current waypoint C, and a next waypoint N, and wherein the current waypoint C becomes a previous waypoint P' and the next waypoint becomes a current waypoint C'.

44. A method of navigating a vehicle, comprising:

defining an intended path by a series of waypoints, wherein at least one of the waypoints is moving;

commanding guidance of the vehicle from a previous waypoint to a current waypoint, wherein departure from the previous waypoint is controlled by guidance commands based at least on the previous waypoint and approach to the current waypoint is controlled by guidance commands based at least on the current waypoint, and wherein commanding guidance comprises accounting for the movement of at least one of the waypoints; and commanding guidance of the vehicle to reduce divergence from an intended position on the intended path based at least on a target distance along the intended path ahead of the intended position, wherein said target distance ahead of the vehicle is constant.

45. A method of navigating a vehicle in flight, comprising:

defining an intended flight path by a series of waypoints;

crabbing into wind during flight to maintain a course of flight of the vehicle;

determining guidance commands of a navigational controller using a Bezier curve navigation process using the waypoints of the intended flight path; and periodically adjusting navigation of the course of flight in response to the guidance commands of the navigational controller.

46. A vehicle, comprising:

a guidance system for controlling movement of the vehicle;

a navigation processor that provides commanded navigation adjustments to said guidance system by defining:

a path defined by a series of waypoints;

a current position relative to the path;

a target position along the path; and a guidance command for directing the vehicle towards the target position, wherein the guidance command is capable of accounting for movement of at least one of the waypoints; and a waypoint movement system for obtaining data of movement of at least one waypoint.

47. The system of claim 46, wherein said waypoint movement system comprises a sensor to observe movement of at least one waypoint.

48. The system of claim 46, wherein said waypoint movement system comprise a transceiver to receive data of movement of at least one waypoint.

* * * * *